(12) United States Patent
Yang et al.

(10) Patent No.: US 12,098,439 B2
(45) Date of Patent: Sep. 24, 2024

(54) STEEL SHEET, MEMBER, AND METHOD FOR PRODUCING THEM

(71) Applicant: JFE STEEL CORPORATION, Tokyo (JP)

(72) Inventors: Lingling Yang, Tokyo (JP); Yoshiyasu Kawasaki, Tokyo (JP); Tatsuya Nakagaito, Tokyo (JP); Shotaro Terashima, Tokyo (JP); Shunsuke Yamamoto, Tokyo (JP); Katsuya Hoshino, Tokyo (JP); Yuki Takeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/915,739

(22) PCT Filed: Mar. 25, 2021

(86) PCT No.: PCT/JP2021/012660
§ 371 (c)(1),
(2) Date: Sep. 29, 2022

(87) PCT Pub. No.: WO2021/200578
PCT Pub. Date: Oct. 7, 2021

(65) Prior Publication Data
US 2023/0127243 A1    Apr. 27, 2023

(30) Foreign Application Priority Data

Mar. 31, 2020 (JP) .................................. 2020-062956
Jul. 16, 2020 (JP) .................................. 2020-122182

(51) Int. Cl.
C22C 38/60    (2006.01)
B21C 47/02    (2006.01)
(Continued)

(52) U.S. Cl.
CPC ................ C21D 9/46 (2013.01); B21C 47/02 (2013.01); B32B 15/013 (2013.01);
(Continued)

(58) Field of Classification Search
CPC ........ C21D 2211/001; C21D 2211/002; C21D 2211/005; C21D 2211/008; C21D 1/185; C21D 1/25; C21D 1/76; C21D 9/46; C21D 6/001; C21D 6/002; C21D 6/005; C21D 6/007; C21D 6/008; C21D 8/0205; C21D 8/0226; C21D 8/0263; C21D 8/0236; C21D 8/0242; C21D 8/0273; C21D 8/0278; B21C 47/02; B32B 15/013; B32B 15/015; B32B 15/04; B32B 15/043; B32B 15/18; C22C 38/001; C22C 38/002; C22C 38/005; C22C 38/008; C22C 38/02; C22C 38/04; C22C 38/06; C22C 38/08; C22C 38/10; C22C 38/12; C22C 38/14; C22C 38/16; C22C 38/38; C22C 38/60; C22C 38/18; C22C 38/20; C22C 38/22; C22C 38/24; C22C 38/26; C22C 38/28; C22C 38/30; C22C 38/32; C22C 38/34; C22C 38/40; C22C 38/42; C22C 38/44; C22C 38/46; C22C 38/48; C22C 38/50; C22C 38/52; C22C 38/54; C22C 38/58; C23C 2/02; C23C 2/06; C23C 2/29; C23C 2/40; C23C 2/285; C23C 28/025; C23C 28/021; C23C 28/3225;
(Continued)

(56) References Cited

U.S. PATENT DOCUMENTS

2011/0226393 A1* 9/2011 Senuma .................. C22C 38/04
                                                                148/645
2014/0227555 A1* 8/2014 Kawata ................. C23C 2/0222
                                                                148/287
(Continued)

FOREIGN PATENT DOCUMENTS

CN    106574337 A    4/2017
EP    2339044 A1     6/2011
(Continued)

OTHER PUBLICATIONS

Aug. 3, 2023 Office Action issued in Chinese Patent Application No. 202180025289.0.
Aug. 14, 2023 Extended European Search Report issued in European Patent Application No. 21780573.8.
Zhang et al. "Feasibility Analysis of the Production of Q&P Steel by Thin Slab Continuous Casting and Rolling Process", Wuhan Iron and Steel Corporation Technology, Issue 06, Dec. 26, 2017, pp. 1-13.
(Continued)

Primary Examiner — Michael E. La Villa
(74) Attorney, Agent, or Firm — Oliff PLC

(57) ABSTRACT

A steel sheet having a tensile strength (TS) of 1180 MPa or more, high LME resistance, and good weld fatigue properties. The steel sheet has a specific chemical composition and a specific steel microstructure. Crystal grains containing an oxide of Si and/or Mn in a region within 4.9 μm in a thickness direction from a surface of the steel sheet have an average grain size in the range of 3 to 10 μm, the lowest Si concentration $L_{Si}$ and the lowest Mn concentration $L_{Mn}$ in the region within 4.9 μm in the thickness direction from the surface of the steel sheet and a Si concentration $T_{Si}$ and a Mn concentration $T_{Mn}$ at a quarter thickness position of the steel sheet satisfy a specified formula.

24 Claims, No Drawings

(51) Int. Cl.
| | |
|---|---|
| B32B 15/01 | (2006.01) |
| B32B 15/04 | (2006.01) |
| B32B 15/18 | (2006.01) |
| C21D 1/18 | (2006.01) |
| C21D 1/25 | (2006.01) |
| C21D 1/76 | (2006.01) |
| C21D 6/00 | (2006.01) |
| C21D 8/02 | (2006.01) |
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/10 | (2006.01) |
| C22C 38/12 | (2006.01) |
| C22C 38/14 | (2006.01) |
| C22C 38/16 | (2006.01) |
| C22C 38/18 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/30 | (2006.01) |
| C22C 38/32 | (2006.01) |
| C22C 38/34 | (2006.01) |
| C22C 38/38 | (2006.01) |
| C22C 38/40 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |
| C22C 38/52 | (2006.01) |
| C22C 38/54 | (2006.01) |
| C22C 38/58 | (2006.01) |
| C23C 2/02 | (2006.01) |
| C23C 2/06 | (2006.01) |
| C23C 2/28 | (2006.01) |
| C23C 2/40 | (2006.01) |
| C23C 28/00 | (2006.01) |
| C23C 28/02 | (2006.01) |
| C23C 30/00 | (2006.01) |

(52) U.S. Cl.
CPC ............ *B32B 15/015* (2013.01); *B32B 15/04* (2013.01); *B32B 15/043* (2013.01); *B32B 15/18* (2013.01); *C21D 1/185* (2013.01); *C21D 1/25* (2013.01); *C21D 1/76* (2013.01); *C21D 6/001* (2013.01); *C21D 6/002* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0242* (2013.01); *C21D 8/0263* (2013.01); *C21D 8/0273* (2013.01); *C21D 8/0278* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/34* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *C22C 38/60* (2013.01); *C23C 2/02* (2013.01); *C23C 2/06* (2013.01); *C23C 2/285* (2013.01); *C23C 2/29* (2022.08); *C23C 2/40* (2013.01); *C23C 28/021* (2013.01); *C23C 28/025* (2013.01); *C23C 28/3225* (2013.01); *C23C 30/00* (2013.01); *C23C 30/005* (2013.01); *C21D 2211/001* (2013.01); *C21D 2211/002* (2013.01); *C21D 2211/005* (2013.01); *C21D 2211/008* (2013.01); *Y10T 428/12458* (2015.01); *Y10T 428/12792* (2015.01); *Y10T 428/12958* (2015.01); *Y10T 428/12965* (2015.01); *Y10T 428/12972* (2015.01); *Y10T 428/24942* (2015.01); *Y10T 428/2495* (2015.01); *Y10T 428/24967* (2015.01); *Y10T 428/24983* (2015.01); *Y10T 428/26* (2015.01); *Y10T 428/263* (2015.01); *Y10T 428/264* (2015.01); *Y10T 428/265* (2015.01)

(58) Field of Classification Search
CPC .................. C23C 30/00; C23C 30/005; Y10T 428/12792; Y10T 428/12958; Y10T 428/12972; Y10T 428/12951; Y10T 428/12965; Y10T 428/12458; Y10T 428/24942; Y10T 428/2495; Y10T 428/24967; Y10T 428/24983; Y10T 428/263; Y10T 428/264; Y10T 428/265; Y10T 428/26
See application file for complete search history.

(56) References Cited

U.S. PATENT DOCUMENTS

| | | |
|---|---|---|
| 2016/0312329 A1 | 10/2016 | Hasegawa et al. |
| 2017/0211164 A1 | 7/2017 | Kimura et al. |
| 2017/0275726 A1 | 9/2017 | Hasegava et al. |
| 2018/0371570 A1 | 12/2018 | Kim et al. |
| 2020/0230918 A1 | 7/2020 | Morishita et al. |

FOREIGN PATENT DOCUMENTS

| | | |
|---|---|---|
| EP | 2746416 A1 | 6/2014 |
| EP | 3309273 A1 | 4/2018 |
| JP | 2006-265671 A | 10/2006 |
| JP | 2009-221555 A | 10/2009 |
| JP | 4943558 B2 | 5/2012 |
| JP | 2013-163827 A | 8/2013 |
| JP | 2015-196891 A | 11/2015 |
| JP | 2017-002384 A | 1/2017 |
| JP | 2019-504196 A | 2/2019 |
| WO | 2015/092982 A1 | 6/2015 |
| WO | 2019/026116 A1 | 2/2019 |
| WO | 2019/077777 A1 | 4/2019 |
| WO | 2020/158066 A1 | 8/2020 |

OTHER PUBLICATIONS

Masui et al. Warp Control in Strip Processing Plant', ISIJ International, vol. 31, No. 3, 1991, pp. 262-267.

(56) References Cited

OTHER PUBLICATIONS

Jun. 8, 2021 International Search Report issued in International Application No. PCT/JP2021/012660.

* cited by examiner

STEEL SHEET, MEMBER, AND METHOD FOR PRODUCING THEM

TECHNICAL FIELD

This application relates to a steel sheet, a member, and a method for producing them. More particularly, the application relates to a steel sheet with a tensile strength (TS) of 1180 MPa or more, high LME resistance, and good weld fatigue properties, a member, and a method for producing them.

BACKGROUND

In recent years, for example, in the automobile industry, from the perspective of protecting the global environment, improved fuel efficiency of automobiles has always been an important issue to reduce carbon dioxide ($CO_2$) emission. To improve the fuel efficiency of automobiles, it is effective to decrease the weight of automobile bodies, and it is necessary to decrease the weight of automobile bodies while maintaining the strength of the automobile bodies. Weight reduction can be achieved by reinforcing a steel sheet used as a material for automotive parts, simplifying the structure, and decreasing the number of parts.

High-strength steel sheets with a tensile strength (hereinafter also referred to simply as TS) of 1180 MPa or more, however, typically contain large amounts of alloying elements required for reinforcement, and therefore a heat-affected zone around a melted and solidified zone called a nugget has insufficient toughness particularly in resistance spot welding. Thus, the weld has a decreased fatigue strength. If the decrease in weld fatigue strength can be reduced, the entire collision strength of automobiles can be sufficiently maintained. Although various techniques have been proposed, they are not directly focused on the weld fatigue strength.

Patent Literature 1 discloses a hot-dip galvannealed high-strength steel sheet with high workability and high resistance to liquid metal embrittlement cracking. Patent Literature 2 discloses a high-strength hot-dip galvannealed steel sheet with high fatigue durability and a method for producing the steel sheet.

Furthermore, it has recently been confirmed that spot welding of a high-strength hot-dip galvanized steel sheet and a high-strength hot-dip galvannealed steel sheet or spot welding of a high-strength cold-rolled steel sheet and a galvanized steel sheet causes liquid metal embrittlement cracking (LMEC, hereinafter also referred to as LME cracking) at a weld when assembling automobile bodies and parts. LME cracking is caused by melting of zinc in a galvanized layer during spot welding, penetration of molten zinc into a grain boundary of a steel microstructure of a weld, and the action of stress generated when a welding electrode is opened. Even for an ungalvanized high-strength cold-rolled steel sheet, spot welding with a galvanized steel sheet may cause LME cracking due to contact between zinc melted in the galvanized steel sheet and the high-strength cold-rolled steel sheet. Due to high C, Si, and Mn contents, high-strength steel sheets with a tensile strength of 1180 MPa or more may cause LME cracking.

CITATION LIST

Patent Literature

PTL 1: Japanese Unexamined Patent Application Publication No. 2006-265671
PTL 2: Japanese Patent No. 4943558

SUMMARY

Technical Problem

For a high-strength hot-dip galvannealed steel sheet described in Patent Literature 1, a technique is described in which Ti, Nb, V, Mo, and Zr based precipitates or composite precipitates are dispersed to refine an austenite phase and improve the resistance to liquid metal embrittlement cracking. In this technique, however, an increased number of Ti, Nb, V, Mo, Zr based precipitates or composite precipitates become starting points for cracking in press forming and cause a problem from a practical standpoint.

Furthermore, Patent Literature 2 describes a technique of improving fatigue durability by an oxide containing Si and Mn satisfying $d/4 \leq D \leq 2d$, wherein d denotes the depth from the interface between a coating and base steel, and D denotes the depth of a soft layer. However, it is difficult by this technique to reduce the decrease in fatigue strength of a weld deformed by high-speed collision.

As described above, these known techniques have a problem in the fatigue strength of a weld when the weld is changed in shape, and practically to avoid the problem by using a reinforcing member, which significantly limits the weight reduction effect.

Patent Literature 1 and Patent Literature 2 do not describe a steel sheet with a high tensile strength (TS) of 1180 MPa or more and with generally satisfied LME resistance and weld fatigue properties.

The disclosed embodiments solve the problems of the related art and aims to provide a steel sheet with a tensile strength (TS) of 1180 MPa or more, high LME resistance, and good weld fatigue properties, a member, and a method for producing them.

The term "tensile strength", as used herein, refers to an average tensile strength in a tensile test performed five times in accordance with JIS Z 2241 on a No. 5 test specimen specified by JIS Z 2201 in a longitudinal direction (tensile direction) perpendicular to the rolling direction.

The phrase "high LME resistance", as used herein, refers to no crack of 0.1 mm or more observed in a resistance welding cracking test described below.

(1) A test specimen of a steel sheet cut to 30 mm×100 mm in a longitudinal direction perpendicular to the rolling direction and another test specimen made of a 980 MPa grade hot-dip galvanized steel sheet are subjected to resistance welding (spot welding) to produce a member.

(2) A set of the two steel sheets tilted 5 degrees is subjected to resistance spot welding in a servomotor pressurization type single-phase alternating current (50 Hz) resistance welding machine attached to a welding gun. The welding conditions include a welding pressure of 3.8 kN, a holding time of 0.2 seconds, a welding current in the range of 5.7 to 6.2 kA, a weld time of 21 cycles, and a holding time of 5 cycles.

(3) A test specimen is cut in half from the welded member, and a cross section is observed with an optical microscope to check for a crack of 0.1 mm or more.

The phrase "good weld fatigue properties", as used herein, refers to a load range of 5000 N or more in a cross-tension test according to JIS Z 3137 under the following conditions.

(1) Spot welding is performed with an electrode DR 6 mm-40R at a welding pressure of 4802 N (490 kgf) for a weld time of 17 cycles. The current value is adjusted so that the nugget diameter is 6.5 mm. Thus, a cross-tension test specimen is formed.

(2) A cross-tension test is then performed in accordance with JIS Z 3137. The cross head speed is 100 mm/min.

(3) Whether or not the load range is 5000 N or more is determined.

Solution to Problem

The inventors have made extensive studies to solve the above problems.

The disclosed embodiments provide a steel sheet such that the steel sheet has a specified chemical composition and a specified steel microstructure, wherein crystal grains containing an oxide of Si and/or Mn in a region within 4.9 μm in a thickness direction from a surface of the steel sheet have an average grain size in the range of 3 to 10 μm, and the lowest Si concentration $L_{Si}$ and the lowest Mn concentration $L_{Mn}$ in the region within 4.9 μm in the thickness direction from the surface of the steel sheet and a Si concentration $T_{Si}$ and a Mn concentration $T_{Mn}$ at a quarter thickness position of the steel sheet satisfy a specified relational expression. The inventors have completed the disclosed embodiments by finding that this can provide a steel sheet with a tensile strength (TS) of 1180 MPa or more, high LME resistance, and good weld fatigue properties.

The disclosed embodiments are based on these findings. The gist of the disclosed embodiments can be summarized as follows:

[1] A steel sheet having a chemical composition containing Si: 0.3% to 2.0% and Mn: 2.70% or more and less than 4.0% on a mass percent basis, and a steel microstructure with a total area fraction of bainite and tempered martensite in the range of 50% to 75%, a fresh martensite area fraction in the range of 5% to 15%, a retained austenite area fraction in the range of 8% to 20%, and a ferrite area fraction in the range of 3% to 20%, wherein a total fraction of the fresh martensite and the retained austenite adjacent to the ferrite is 90% or less of the total area fraction of the fresh martensite and the retained austenite, crystal grains containing an oxide of Si and/or Mn in a region within 4.9 μm in a thickness direction from a surface of the steel sheet have an average grain size in the range of 3 to 10 μm, the lowest Si concentration $L_{Si}$ and the lowest Mn concentration $L_{Mn}$ in the region within 4.9 μm in the thickness direction from the surface of the steel sheet and a Si concentration $T_{Si}$ and a Mn concentration $T_{Mn}$ at a quarter thickness position of the steel sheet satisfy the following formula (1), and the steel sheet has a tensile strength (TS) of 1180 MPa or more.

$$L_{Si}+L_{Mn} \leq (T_{Si}+T_{Mn})/5 \quad (1)$$

[2] The steel sheet according to [1], wherein the chemical composition further contains, on a mass percent basis, C: 0.12% to 0.40%,
P: 0.05% or less,
S: 0.02% or less,
Al: 0.01% to 2.0%, and
N: 0.01% or less, the remainder being Fe and incidental impurities.

[3] The steel sheet according to [2], wherein the chemical composition further contains, on a mass percent basis, at least one of Nb: 0.50% or less, Cr: 1.0% or less, Mo: 0.50% or less, B: 0.005% or less, and Ti: 0.05% or less.

[4] The steel sheet according to [2] or [3], wherein the chemical composition further contains, on a mass percent basis, at least one of Cu, Ni, Sn, As, Sb, Ca, Mg, Pb, Co, Ta, W, REM, Zn, V, Sr, Cs, Hf, and Zr in a total amount of 0.1% or less.

[5] The steel sheet according to any one of [1] to [4], including a soft layer with a thickness in the range of 1.0 to 50.0 μm in the thickness direction from a surface of the steel sheet, the soft layer being a region with hardness corresponding to 65% or less of the hardness at a quarter thickness position from the surface of the steel sheet.

[6] The steel sheet according to any one of [1] to [5], including a hot-dip galvanized layer or a hot-dip galvannealed layer on a surface of the steel sheet.

[7] The steel sheet according to any one of [1] to [6], wherein the chemical composition has an equivalent carbon content Ceq of 0.659% or more.

[8] A member produced by performing at least one of forming and welding on the steel sheet according to any one of [1] to [7].

[9] A method for producing a steel sheet, including:

a hot rolling step of hot rolling a steel slab with the chemical composition according to any one of [1] to [4] at a cumulative strain in the range of 0.10 to 0.80 in final two rolling steps followed by coiling at a coiling temperature in the range of 470° C. to 800° C.;

a cold-rolling step of cold-rolling a hot-rolled steel sheet formed in the hot-rolling step;

an annealing step of holding a cold-rolled steel sheet formed in the cold-rolling step at a dew-point temperature in the range of −50° C. to 0° C. and at an annealing temperature in the range of 750° C. to 900° C., cooling the cold-rolled steel sheet to a cooling stop temperature in the range of 150° C. to 340° C., and bending and unbending the cold-rolled steel sheet three to eight times in total with a roller with a radius in the range of 100 to 1000 mm while cooling from the annealing temperature to the cooling stop temperature; and a reheating step of reheating the steel sheet after the annealing step to a temperature range of 350° C. to 600° C. and holding the temperature.

[10] The method for producing a steel sheet according to [9], further including a plating step of performing hot-dip galvanizing or hot-dip galvannealing on the steel sheet after the reheating step.

[11] A method for producing a steel sheet, including:

a hot rolling step of hot rolling a steel slab with the chemical composition according to any one of [1] to [4] at a cumulative strain in the range of 0.10 to 0.80 in final two rolling steps followed by coiling at a coiling temperature in the range of 470° C. to 800° C.;

a cold-rolling step of cold-rolling a hot-rolled steel sheet formed in the hot-rolling step;

an annealing step of holding a cold-rolled steel sheet formed in the cold-rolling step at a dew-point temperature in the range of −50° C. to 0° C. and at an annealing temperature in the range of 750° C. to 900° C., cooling the cold-rolled steel sheet to a cooling stop temperature in the range of 350° C. to 500° C., and bending and unbending the cold-rolled steel sheet three to eight times in total with a roller with a radius in the range of 100 to 1000 mm while cooling from the annealing temperature to the cooling stop temperature;

a plating step of performing hot-dip galvanizing or hot-dip galvannealing on the steel sheet after the annealing step; and a reheating step of cooling the steel sheet after the plating step to a cooling stop temperature in the range of 50° C. to 350° C., reheating the steel sheet to a temperature exceeding the cooling stop temperature and in the range of 300° C. to 500° C., and holding the temperature.

[12] The method for producing a steel sheet according to any one of [9] to [11], wherein the chemical composition has an equivalent carbon content Ceq of 0.659% or more.

[13] A method for producing a member, including the step of performing at least one of forming and welding on a steel sheet produced by the method for producing a steel sheet according to any one of [9] to [12].

[14] A steel sheet having
a chemical composition containing Si: 0.3% to 2.0% and Mn: 2.70% or more and less than 4.0% on a mass percent basis, and
a steel microstructure with a total area fraction of bainite and tempered martensite in the range of 50% to 75%, a fresh martensite area fraction in the range of 5% to 15%, a retained austenite area fraction in the range of 8% to 20%, and a ferrite area fraction in the range of 3% to 20%,
wherein a total fraction of the fresh martensite and the retained austenite adjacent to the ferrite is 90% or less of the total area fraction of the fresh martensite and the retained austenite,
crystal grains containing an oxide of Si and/or Mn in a region within 15.0 μm in a thickness direction from a surface of the steel sheet have an average grain size in the range of 3 to 10 μm,
the lowest Si concentration $L_{Si}$ and the lowest Mn concentration $L_{Mn}$ in the region within 15.0 μm in the thickness direction from the surface of the steel sheet and a Si concentration $T_{Si}$ and a Mn concentration $T_{Mn}$ at a quarter thickness position of the steel sheet satisfy the following formula (1), and
the steel sheet has a tensile strength (TS) of 1180 MPa or more.

$$L_{Si}+L_{Mn} \leq (T_{Si}+T_{Mn})/5 \quad (1)$$

[15] The steel sheet according to [14], wherein the chemical composition further contains, on a mass percent basis,
C: 0.12% to 0.40%,
P: 0.05% or less,
S: 0.02% or less,
Al: 0.01% to 2.0%, and
N: 0.01% or less, the remainder being Fe and incidental impurities.

[16] The steel sheet according to [15], wherein the chemical composition further contains, on a mass percent basis, at least one of Nb: 0.50% or less, Cr: 1.0% or less, Mo: 0.50% or less, B: 0.005% or less, and Ti: 0.05% or less.

[17] The steel sheet according to [15] or [16], wherein the chemical composition further contains, on a mass percent basis, at least one of Cu, Ni, Sn, As, Sb, Ca, Mg, Pb, Co, Ta, W, REM, Zn, V, Sr, Cs, Hf, and Zr in a total amount of 0.1% or less.

[18] The steel sheet according to any one of [14] to [17], including a soft layer with a thickness in the range of 1.0 to 50.0 μm in the thickness direction from a surface of the steel sheet, the soft layer being a region with hardness corresponding to 65% or less of the hardness at a quarter thickness position from the surface of the steel sheet.

[19] The steel sheet according to any one of [14] to [18], including a hot-dip galvanized layer or a hot-dip galvannealed layer on a surface of the steel sheet.

[20] The steel sheet according to any one of [14] to [19], wherein the chemical composition has an equivalent carbon content Ceq of 0.659% or more.

[21] A member produced by performing at least one of forming and welding on the steel sheet according to any one of [14] to [20].

[22] A method for producing a steel sheet, including:
a hot rolling step of hot rolling a steel slab with the chemical composition according to any one of [14] to [17] at a cumulative strain in the range of 0.10 to 0.80 in final two rolling steps followed by coiling at a coiling temperature in the range of 470° C. to 800° C.;
a cold-rolling step of cold-rolling a hot-rolled steel sheet formed in the hot-rolling step;
an annealing step of holding a cold-rolled steel sheet formed in the cold-rolling step at a dew-point temperature in the range of −50° C. to 20° C. and at an annealing temperature in the range of 750° C. to 900° C., cooling the cold-rolled steel sheet to a cooling stop temperature in the range of 150° C. to 340° C., and bending and unbending the cold-rolled steel sheet three to eight times in total with a roller with a radius in the range of 100 to 1000 mm while cooling from the annealing temperature to the cooling stop temperature; and
a reheating step of reheating the steel sheet after the annealing step to a temperature range of 350° C. to 600° C. and holding the temperature.

[23] The method for producing a steel sheet according to [22], wherein a plating step of performing hot-dip galvanizing or hot-dip galvannealing on the steel sheet after the reheating step.

[24] A method for producing a steel sheet, including:
a hot rolling step of hot rolling a steel slab with the chemical composition according to any one of [14] to [17] at a cumulative strain in the range of 0.10 to 0.80 in final two rolling steps followed by coiling at a coiling temperature in the range of 470° C. to 800° C.;
a cold-rolling step of cold-rolling a hot-rolled steel sheet formed in the hot-rolling step;
an annealing step of holding a cold-rolled steel sheet formed in the cold-rolling step at a dew-point temperature in the range of −50° C. to 20° C. and at an annealing temperature in the range of 750° C. to 900° C., cooling the cold-rolled steel sheet to a cooling stop temperature in the range of 350° C. to 500° C., and bending and unbending the cold-rolled steel sheet three to eight times in total with a roller with a radius in the range of 100 to 1000 mm while cooling from the annealing temperature to the cooling stop temperature;
a plating step of performing hot-dip galvanizing or hot-dip galvannealing on the steel sheet after the annealing step; and
a reheating step of cooling the steel sheet after the plating step to a cooling stop temperature in the range of 50° C. to 350° C., reheating the steel sheet to a temperature exceeding the cooling stop temperature and in the range of 300° C. to 500° C., and holding the temperature.

[25] The method for producing a steel sheet according to any one of [22] to [24], wherein the chemical composition has an equivalent carbon content Ceq of 0.659% or more.

[26] A method for producing a member, including the step of performing at least one of forming and welding on a steel sheet produced by the method for producing a steel sheet according to any one of [22] to [25].

Advantageous Effects

The disclosed embodiments can provide a steel sheet with a tensile strength (TS) of 1180 MPa or more, high LME resistance, and good weld fatigue properties, a member, and a method for producing them.

DETAILED DESCRIPTION

Embodiments are described below.

First, the appropriate ranges of the chemical composition of a steel sheet and the reasons for limiting the appropriate range are described below. In the following description, unless otherwise specified, "%" of the component element content of a steel sheet refers to "% by mass".

A chemical composition of a steel sheet according to the disclosed embodiments contains, on a mass percent basis, Si: 0.3% to 2.0% and Mn: 2.70% or more and less than 4.0%. In addition to the Si and Mn, the chemical composition preferably contains, on a mass percent basis, C: 0.12% to 0.40%, P: 0.05% or less, S: 0.02% or less, Al: 0.01% to 2.0%, and N: 0.01% or less, the remainder being Fe and incidental impurities.

Si: 0.3% to 2.0%

Si is an element that reduces the formation of cementite and promotes the formation of retained austenite. A Si content of 0.3% or more is required for a retained austenite area fraction of 8% or more. A Si content of more than 2.0%, however, results in a weld with low toughness and fatigue strength. Thus, the Si content is 2.0% or less. The Si content is preferably 0.5% or more. The Si content is preferably 1.8% or less.

Mn: 2.70% or More and Less than 4.0%

Mn is an element that increases the hardness of a steel sheet by solid-solution strengthening. A Mn content of less than 2.70% results in a tensile strength of less than 1180 MPa. On the other hand, a Mn content of 4.0% or more results in less ferrite transformation and bainite transformation and an undesirable microstructure. Thus, the Mn content is less than 4.0%. The Mn content is preferably 2.80% or more, more preferably 2.90% or more. Furthermore, the Mn content is preferably 3.90% or less, more preferably 3.80% or less.

C: 0.12% to 0.40%

C is an element necessary to form martensite and increase strength. A C content of less than 0.12% may result in martensite with low hardness and a tensile strength of less than 1180 MPa. On the other hand, a C content of more than 0.40% may result in the formation of a large amount of cementite in a heat-affected zone, a martensite portion with lower toughness in the heat-affected zone, and lower weld fatigue strength. Thus, the C content is preferably 0.12% or more, more preferably 0.14% or more, still more preferably 0.16% or more. Furthermore, the C content is preferably 0.40% or less, more preferably 0.35% or less, still more preferably 0.30% or less.

P: 0.05% or Less

An excessive P content may result in segregation at a grain boundary and lower toughness. Thus, the P content is preferably 0.05% or less, more preferably 0.03% or less, still more preferably 0.02% or less. The lower limit of the P content is preferably, but is not limited to, 0.0005% or more due to constraint of production technology.

S: 0.02% or Less

S may bind to Mn and form coarse MnS, which reduces toughness. Thus, the S content is preferably reduced. The S content is preferably 0.02% or less, more preferably 0.01% or less, still more preferably 0.002% or less. The lower limit of the S content is preferably, but is not limited to, 0.0001% or more due to constraint of production technology.

Al: 0.01% to 2.0%

Deoxidization is important because a large amount of oxide in steel reduces toughness. Al may suppress the precipitation of cementite, and therefore the Al content is preferably 0.01% or more to produce this effect. An Al content of more than 2.0%, however, may result in coagulated and coarsened oxide or nitride, which reduces toughness. Thus, the Al content is preferably 2.0% or less. The Al content is more preferably 0.03% or more. The Al content is more preferably 0.1% or less.

N: 0.01% or Less

In the disclosed embodiments, N is a harmful element and is preferably minimized. N binds to Ti and forms TiN. A N content of more than 0.01%, however, may result in a weld with lower toughness due to an increased amount of TiN formed. Thus, the N content is preferably 0.01% or less, more preferably 0.006% or less. The lower limit of the N content is preferably, but is not limited to, 0.0003% or more due to constraint of production technology.

A steel sheet according to the disclosed embodiments has a chemical composition that contains the above components and the remainder composed of Fe (iron) and incidental impurities. In particular, a steel sheet according to an embodiment preferably has a chemical composition that contains the above components and the remainder composed of Fe and incidental impurities.

A steel sheet according to the disclosed embodiments may further contain the following component elements depending on desired characteristics. The component elements contained below the following upper limits can provide the advantages of the disclosed embodiments. Thus, the component elements do not have particular lower limits and only have the specified upper limits. Any of the following elements contained below appropriate lower limits described below is contained as an incidental impurity.

At least one of Nb: 0.50% or less, Cr: 1.0% or less, Mo: 0.50% or less, B: 0.005% or less, and Ti: 0.05% or less Nb: 0.50% or Less Nb is an element that further enhances the advantages of the disclosed embodiments. Nb refines martensite, prevents coarsening of crystal grains in a heat-affected zone, and improves the toughness of the heat-affected zone. To produce these effects, the Nb content is preferably 0.01% or more, more preferably 0.02% or more. A Nb content of more than 0.50%, however, may result in the precipitation of Nb carbide and low toughness. Thus, the Nb content is preferably 0.50% or less. The Nb content is more preferably 0.30% or less. Furthermore, Nb can reduce the liquid-metal embrittlement of a welded joint and improve the strength of the joint.

Cr: 1.0% or Less

Cr is an element that has the effect of reducing temper embrittlement. Thus, Cr further enhances the advantages of the disclosed embodiments. To produce this effect, the Cr content is preferably 0.1% or more. A Cr content of more than 1.0%, however, may result in the formation of Cr carbide and a heat-affected zone with lower toughness. Thus, the Cr content is preferably 1.0% or less. The Cr content is more preferably 0.80% or less, still more preferably 0.60% or less.

Mo: 0.50% or Less

Mo promotes the nucleation of austenite and increases fresh martensite and retained austenite. To produce these effects, the Mo content is preferably 0.01% or more. On the other hand, segregation of Mo at grain boundaries stops the grain growth of ferrite and decreases the ferrite fraction. To prevent this, the Mo content is preferably 0.50% or less, more preferably 0.30% or less. The Mo content is still more preferably 0.20% or less.

B: 0.005% or Less

B segregates at austenite grain boundaries, retards ferrite transformation after rolling, and promotes the formation of fresh martensite. To sufficiently produce these effects, the B content is preferably 0.0001% or more. A B content of more than 0.005%, however, may result in the formation of $Fe_{23}(CB)_6$, which acts as a starting point for void formation in a weld, and result in lower weld fatigue strength. Thus, the B content is preferably 0.005% or less. The B content is more preferably 0.0045% or less, still more preferably 0.0040% or less.

Ti: 0.05% or Less

Ti binds to N, forms a nitride, reduces the formation of BN, induces the effects of B, forms TiN and refines crystal grains, and contributes to the reinforcement of a steel sheet. To produce these effects, the Ti content is preferably 0.005% or more. A Ti content of more than 0.05%, however, tends to result in the formation of coarse carbide containing Ti, which may be a starting point for void formation in a weld. Thus, the Ti content is preferably 0.05% or less. The Ti content is more preferably 0.045% or less, still more preferably 0.040% or less.

At Least One of Cu, Ni, Sn, as, Sb, Ca, Mg, Pb, Co, Ta, W, REM, Zn, V, Sr, Cs, Hf, and Zr: 0.1% or Less in Total A steel sheet according to the disclosed embodiments may contain at least one of Cu, Ni, Sn, As, Sb, Ca, Mg, Pb, Co, Ta, W, REM, Zn, V, Sr, Cs, Hf, and Zr in a total amount of 0.1% or less. The total content is preferably 0.10% or less, more preferably 0.08% or less. The total content is still more preferably 0.03% or less. The lower limit of the total content is preferably, but is not limited to, 0.001% or more.

Equivalent Carbon Content Ceq: 0.659% or More

To achieve a TS of 1180 MPa or more, the equivalent carbon content Ceq of a chemical composition in a method for producing a steel sheet according to the disclosed embodiments is preferably 0.659% or more. The equivalent carbon content Ceq may have any upper limit but is preferably less than 0.852% because an excessively high equivalent carbon content Ceq may result in a lower El.

The equivalent carbon content Ceq can be determined using the following formula. The equivalent carbon content is calculated in a thickness range except a portion of a soft layer described later.

Equivalent carbon content Ceq=[C %]+([Si %]/24)+ ([Mn %]/6)+([Ni %]/40)+([Cr %]/5)+([Mo %]/4)+([V %]/14)

The [element symbol %] in the formula represents the element content (% by mass), and an element not contained is 0.

The steel microstructure of a high-strength steel sheet according to the disclosed embodiments is described below.

A steel sheet according to the disclosed embodiments has a steel microstructure with a total area fraction of bainite and tempered martensite in the range of 50% to 75%, a fresh martensite area fraction in the range of 5% to 15%, a retained austenite area fraction in the range of 8% to 20%, and a ferrite area fraction in the range of 3% to 20%. The fraction of fresh martensite and retained austenite adjacent to ferrite relative to the total area fraction of fresh martensite and retained austenite is 90% or less in total. A method for measuring the area fraction is described later and is also described in the examples.

Total Area Fraction of Bainite and Tempered Martensite: 50% to 75%

The hardness of bainite and tempered martensite is higher than the hardness of ferrite and lower than the hardness of fresh martensite. Thus, fewer voids are formed between a hard phase and a soft phase of a weld. To produce this effect, the total area fraction of bainite and tempered martensite is 50% or more. A total area fraction of more than 75%, however, results in lower strength and a tensile strength of less than 1180 MPa. Thus, the total area fraction of bainite and tempered martensite ranges from 50% to 75%. The total area fraction of bainite and tempered martensite is preferably 52% or more, more preferably 55% or more, and preferably 72% or less, more preferably 70% or less.

Fresh Martensite Area Fraction: 5% to 15%

Fresh martensite is a hard phase and has the effect of increasing the strength of a steel sheet. To achieve a tensile strength of 1180 MPa or more, the fresh martensite area fraction is 5% or more. An area fraction of more than 15%, however, causes a starting point for void formation in a weld and causes a crack. Thus, the fresh martensite area fraction ranges from 5% to 15%. The fresh martensite area fraction is preferably 6% or more, more preferably 7% or more, and preferably 14% or less, more preferably 13% or less.

Retained Austenite Area Fraction: 8% to 20%

Retained austenite has the effect of improving the ductility of a base material. To produce this effect, the retained austenite area fraction is 8% or more. On the other hand, an increase in retained austenite results in a steel sheet with lower strength. Thus, for a tensile strength of 1180 MPa or more, the retained austenite area fraction is 20% or less. In the disclosed embodiments, the retained austenite volume fraction measured by the method described in the examples is regarded as the retained austenite area fraction. The retained austenite area fraction is preferably 9% or more, more preferably 10% or more, and preferably 19% or less, more preferably 18% or less.

Ferrite Area Fraction: 3% to 20%

Ferrite is a soft phase and contributes to the ductility of a steel sheet. Thus, the base material microstructure of a steel sheet according to the disclosed embodiments should have a ferrite area fraction of 3% or more. A ferrite area fraction of more than 20%, however, results in excessive softening and makes it difficult to provide a steel sheet with high strength. Thus, the ferrite area fraction ranges from 3% to 20%. The ferrite area fraction is preferably 4% or more, more preferably 5% or more, and preferably 19% or less, more preferably 18% or less.

Fraction of Fresh Martensite and Retained Austenite Adjacent to Ferrite Relative to the Total Area Fraction of the Fresh Martensite and the Retained Austenite: 90% or Less The term "fresh martensite and retained austenite adjacent to ferrite", as used herein, refers to fresh martensite and retained austenite having at least part of the interface with ferrite. Due to a difference in hardness of the microstructure, voids are easily formed at the interface between fresh martensite and ferrite, and connection of voids easily causes a crack around a nugget. To prevent the formation of voids, the fraction of fresh martensite and retained austenite adjacent to ferrite should be 90% or less of the total area fraction of the fresh martensite and the retained austenite. The fraction is preferably 87% or less, more preferably 85% or less.

From the perspective of the advantages of the disclosed embodiments, the lower limit is preferably, but is not limited, 15% or more in a steel sheet according to embodiments. Fresh martensite and retained austenite are difficult to be distinguished by scanning electron microscope observation used as a method for measuring the area fraction. Thus, the total of fresh martensite and retained austenite is specified.

A steel microstructure according to the disclosed embodiments may also contain a carbide, such as pearlite or cementite, or another known steel sheet microstructure in the remainder other than ferrite, bainite, tempered martensite, fresh martensite, and retained austenite. From the perspective of the advantages of the disclosed embodiments, the area fraction of the remainder is preferably 15% or less. The other steel sheet microstructure (remaining microstructure) may be determined by SEM observation, for example.

In a specific method for measuring the area fraction of a steel microstructure, first, a thickness cross section of a formed steel sheet in the rolling direction is polished and corroded with 1% by volume nital. Ten fields in a region from the surface to a t/4 thickness position are photographed with a scanning electron microscope at a magnification of 3000 times. The area fraction of each microstructure is determined using Image-Pro manufactured by Media Cybernetics from image data thus obtained, and the average area fraction in the fields is defined as the area fraction of each microstructure. "t" denotes the thickness of the steel sheet (sheet thickness). In the image data, ferrite is distinguished as black, fresh martensite and retained austenite are distinguished as white or light gray, and tempered martensite and bainite, which contain carbide, are distinguished as dark gray. The fresh martensite area fraction is determined by subtracting the retained austenite area fraction described later from the area percentage of the white or light gray microstructures. For retained austenite, as described later, the volume fraction is determined by X-ray diffractometry and is regarded as an area fraction. A value calculated by subtracting the retained austenite volume fraction determined by X-ray diffractometry from the total area fraction of fresh martensite and retained austenite determined by scanning electron microscope observation is regarded as a fresh martensite area fraction.

The retained austenite volume fraction is measured by the following method. A steel sheet is mechanically ground in the thickness direction (depth direction) to a quarter thickness and is then chemically polished with oxalic acid to form an observation surface. The observation surface is observed by X-ray diffractometry. A Co Kα radiation source is used for incident X-rays. The ratio of the diffraction intensities of (200), (220), and (311) planes of fcc iron (austenite) to the diffraction intensities of (200), (211), and (220) planes of bcc iron is determined as the retained austenite volume fraction.

For the fraction of fresh martensite and retained austenite adjacent to ferrite, the fraction of fresh martensite and retained austenite in contact with ferrite at one or more portions at microstructure boundaries on the observation surface relative to the fresh martensite and the retained austenite is determined as an area fraction.

Average Grain Size of Crystal Grains Containing an Oxide of Si and/or Mn in a Region within 4.9 μm in a Thickness Direction from a Surface of a Steel Sheet: 3 to 10 μm The phrase "crystal grains containing an oxide of Si and/or Mn", as used herein, refers to oxide grains containing one or more granular oxides of Si and/or Mn in the grains. To achieve high LME resistance and good weld fatigue properties, crystal grains containing an oxide of Si and/or Mn in a region within 4.9 μm in a thickness direction from a surface of a steel sheet have an average grain size in the range of 3 to 10 μm. An oxide of Si and/or Mn is easily formed at a grain boundary with relatively high oxygen potential. When the average grain size of crystal grains containing an oxide of Si and/or Mn in the region within 4.9 μm in the thickness direction from the surface of the steel sheet exceeds 10 μm, the formation of an oxidized portion on a grain boundary is reduced, and a weld tends to have a crack. Thus, the average grain size is 10 μm or less. An average grain size of less than 3 μm, however, results in the formation of coarse oxide on a grain boundary, which tends to cause a crack in a weld. Thus, the average grain size is 3 μm or more. At an average grain size of 3 μm or more, crystal grains themselves have high deformability, and high LME resistance can be achieved.

In the disclosed embodiments, SEM observation and energy dispersive X-ray analysis (EDX) on a cross section of a steel sheet (L cross section: a cross section parallel to the rolling direction and perpendicular to the surface of the steel sheet) are performed to determine the type of oxide in the region within 4.9 μm in the thickness direction from the surface of the steel sheet and to measure the average grain size of crystal grains containing an oxide of Si and/or Mn. The average grain size of crystal grains is the average of grain sizes measured by microtomy in a cross section (L cross section) of a steel sheet in a direction parallel to the surface of the steel sheet.

As described above, when crystal grains containing an oxide of Si and/or Mn in the region within 4.9 μm in the thickness direction from the surface of the steel sheet have an average grain size in the range of 3 to 10 μm, high LME resistance and good weld fatigue properties can be achieved. When crystal grains containing an oxide of Si and/or Mn in a region within 15.0 μm in the thickness direction from the surface of the steel sheet have an average grain size in the range of 3 to 10 μm, higher LME resistance and better weld fatigue properties can be achieved.

In the disclosed embodiments, SEM observation and energy dispersive X-ray analysis (EDX) on a cross section of a steel sheet (L cross section: a cross section parallel to the rolling direction and perpendicular to the surface of the steel sheet) are performed to determine the type of oxide in the region within 15.0 μm in the thickness direction from the surface of the steel sheet and to measure the average grain size of crystal grains containing an oxide of Si and/or Mn. The average grain size of crystal grains is the average of grain sizes measured by microtomy in a cross section (L cross section) of a steel sheet in a direction parallel to the surface of the steel sheet.

The lowest Si concentration $L_{Si}$ and the lowest Mn concentration $L_{Mn}$ in the region within 4.9 μm in the thickness direction from the surface of the steel sheet and a Si concentration $T_{Si}$ and a Mn concentration $T_{Mn}$ at a quarter thickness position of the steel sheet satisfy the following formula (1).

$$L_{Si}+L_{Mn} \leq (T_{Si}+T_{Mn})/5 \tag{1}$$

In the case of $L_{Si}+L_{Mn}>(T_{Si}+T_{Mn})/5$, liquid metal embrittlement (LME) is likely to occur while welding, and weldability is reduced. Thus, to achieve high LME resistance, $L_{Si}+L_{Mn} \leq (T_{Si}+T_{Mn})/5$ is satisfied.

The Si concentration $T_{Si}$ and the Mn concentration $T_{Mn}$ at a quarter thickness position of a steel sheet are determined with a field emission-electron probe micro analyzer (FE-EPMA) from the average of 10 points of point analysis at an electron beam diameter of 1 μm at a quarter thickness position of the steel sheet. For the Si concentration in a region within 4.9 μm in a thickness direction from a surface of a steel sheet, the concentration distribution of the Si concentration in the range of 0 to 4.9 μm in the thickness direction from the surface of the steel sheet is determined by line analysis with a field emission-electron probe micro analyzer at an electron beam diameter of 0.1 μm from the surface of the steel sheet in the thickness direction. The lowest Si concentration in the concentration distribution is defined as the concentration $L_{Si}$. Also for the Mn concentration in the region within 4.9 μm in the thickness direction from the surface of the steel sheet, the concentration distribution of the Mn concentration in the range of 0 to 4.9 μm in the thickness direction from the surface of the steel sheet is determined by line analysis with a field emission-electron probe micro analyzer at an electron beam diameter of 0.1 μm from the surface of the steel sheet in the thickness direction. The lowest Mn concentration in the concentration distribution is defined as the concentration $L_{Mn}$. The Si concentration, the Mn concentration, $L_{Si}$, $T_{Si}$, $L_{Mn}$, and $T_{Mn}$ are expressed in % by mass. In the measurement of the Si concentration and the Mn concentration with a field emission-electron probe micro analyzer in the disclosed embodiments, 10 positions without particulate matter were measured and averaged as the Si concentration and the Mn concentration.

As described above, high LME resistance can be achieved when the lowest Si concentration $L_{Si}$ and the lowest Mn concentration $L_{Mn}$ in the region within 4.9 μm in the thickness direction from the surface of the steel sheet and the Si concentration $T_{Si}$ and the Mn concentration $T_{Mn}$ at a quarter thickness position of the steel sheet satisfy the formula (1). Furthermore, higher LME resistance can be achieved when the lowest Si concentration $L_{Si}$ and the lowest Mn concentration $L_{Mn}$ in the region within 15.0 μm in the thickness direction from the surface of the steel sheet and the Si concentration $T_{Si}$ and the Mn concentration $T_{Mn}$ at a quarter thickness position of the steel sheet satisfy the formula (1), that is, when the region satisfying the formula (1) is expanded to the region within 15.0 μm in the thickness direction from the surface of the steel sheet.

The Si concentration $T_{Si}$ and the Mn concentration $T_{Mn}$ at a quarter thickness position of a steel sheet are determined with a field emission-electron probe micro analyzer (FE-EPMA) from the average of 10 points of point analysis at an electron beam diameter of 1 μm at a quarter thickness position of the steel sheet. For the Si concentration in a region within 15.0 μm in a thickness direction from a surface of a steel sheet, the concentration distribution of the Si concentration in the range of 0 to 15.0 μm in the thickness direction from the surface of the steel sheet is determined by line analysis with a field emission-electron probe micro analyzer at an electron beam diameter of 0.1 μm from the surface of the steel sheet in the thickness direction. The lowest Si concentration in the concentration distribution is defined as the concentration $L_{Si}$. Also for the Mn concentration in a region within 15.0 μm in a thickness direction from a surface of a steel sheet, the concentration distribution of the Mn concentration in the range of 0 to 15.0 μm in the thickness direction from the surface of the steel sheet is determined by line analysis with a field emission-electron probe micro analyzer at an electron beam diameter of 0.1 μm from the surface of the steel sheet in the thickness direction. The lowest Mn concentration in the concentration distribution is defined as the concentration $L_{Mn}$. The Si concentration, the Mn concentration, $L_{Si}$, $T_{Si}$, $L_{Mn}$, and $T_{Mn}$ are expressed in % by mass. In the measurement of the Si concentration and the Mn concentration with a field emission-electron probe micro analyzer in the disclosed embodiments, 10 positions without particulate matter were measured and averaged as the Si concentration and the Mn concentration.

Thickness of Soft Layer: 1.0 to 50.0 μm

The term "soft layer", as used herein, refers to a region with hardness corresponding to 65% or less of the hardness at a quarter thickness position from a surface of a steel sheet. A soft layer with a thickness in the range of 1.0 to 50.0 μm in the thickness direction from a surface of a steel sheet can provide higher LME resistance. To produce this effect, a soft layer with a thickness of 1.0 μm or more is preferably formed in the thickness direction from a surface of a steel sheet. On the other hand, to achieve a tensile strength of 1180 MPa or more, when a soft layer is formed, the soft layer preferably has a thickness of 50.0 μm or less in the thickness direction from a surface of a steel sheet.

Measurement is performed on the soft layer as described below. After smoothing a thickness cross section (L cross section) parallel to the rolling direction of a steel sheet by wet grinding, measurement is performed with a Vickers hardness tester at a load of 10 gf from a 1-μm position to a 100-μm position in the thickness direction from the surface of the steel sheet at intervals of 1 μm. Measurement is then performed at intervals of 20 μm to the central portion in the thickness direction. A region with hardness corresponding to 65% or less of the hardness at a quarter thickness position is defined as a soft layer, and the thickness of the region in the thickness direction is defined as the thickness of the soft layer.

A steel sheet according to the disclosed embodiments may have a hot-dip galvanized layer or a hot-dip galvannealed layer on the surface of the steel sheet. The hot-dip galvanized layer and the hot-dip galvannealed layer may have any composition and may be formed by any method. The hot-dip galvanized layer has a composition that contains, for example, Fe: 20% or less by mass and Al: 0.001% to 1.0% by mass and further contains one or two or more selected from the group consisting of Pb, Sb, Si, Sn, Mg, Mn, Ni, Cr, Co, Ca, Cu, Li, Ti, Be, Bi, and REM in a total amount of 0% to 3.5% by mass, the remainder being Zn and incidental impurities. The Fe content of the hot-dip galvanized layer is preferably less than 7% by mass. The Fe content of the hot-dip galvannealed layer preferably ranges from 7% to 15% by mass, more preferably 8% to 12% by mass.

The coating weight is preferably, but is not limited to, in the range of 20 to 80 g/m² per side of a steel sheet.

A steel sheet according to the disclosed embodiments may have any thickness, preferably in the range of 0.5 to 3.0 mm.

A method for producing a steel sheet according to the disclosed embodiments is described below.

Preferred production conditions for a method for producing a steel sheet according to the disclosed embodiments are described below. Unless otherwise specified, the temperature at which a steel slab (steel material), a steel sheet, or the like described below is heated or cooled refers to the surface temperature of the steel slab, the steel sheet, or the like.

First Embodiment

A first embodiment of a method for producing a steel sheet according to the disclosed embodiments includes a hot-rolling step of hot-rolling a steel slab with the above chemical composition at a cumulative strain in the range of 0.10 to 0.80 in the final two rolling stages followed by coiling at a coiling temperature in the range of 470° C. to 800° C., a cold-rolling step of cold-rolling a hot-rolled steel sheet formed in the hot-rolling step, an annealing step of holding a cold-rolled steel sheet formed in the cold-rolling step at a dew-point temperature in the range of −50° C. to 0° C. and at an annealing temperature in the range of 750° C. to 900° C., cooling the cold-rolled steel sheet to a cooling stop temperature in the range of 150° C. to 340° C., and bending and unbending the cold-rolled steel sheet three to eight times in total with a roller with a radius in the range of 100 to 1000 mm while cooling from the annealing temperature to the cooling stop temperature, and a reheating step of reheating the steel sheet after the annealing step to a temperature range of 350° C. to 600° C. and holding the temperature.

A first embodiment of a method for producing a steel sheet according to the disclosed embodiments includes a hot-rolling step of hot-rolling a steel slab with the above chemical composition at a cumulative strain in the range of 0.10 to 0.80 in the final two rolling stages followed by coiling at a coiling temperature in the range of 470° C. to 800° C., a cold-rolling step of cold-rolling a hot-rolled steel sheet formed in the hot-rolling step, an annealing step of holding a cold-rolled steel sheet formed in the cold-rolling step at a dew-point temperature in the range of −50° C. to 20° C. and at an annealing temperature in the range of 750° C. to 900° C., cooling the cold-rolled steel sheet to a cooling stop temperature in the range of 150° C. to 340° C., and bending and unbending the cold-rolled steel sheet three to eight times in total with a roller with a radius in the range of 100 to 1000 mm while cooling from the annealing temperature to the cooling stop temperature, and a reheating step of reheating the steel sheet after the annealing step to a temperature range of 350° C. to 600° C. and holding the temperature.

Each of these steps is described below.

In the disclosed embodiments, a steel material can be melted by any method, for example, by a known melting method using a converter or an electric arc furnace. After the melting process, in consideration of problems, such as segregation, a slab (steel material) is preferably produced by a continuous casting process. A slab may also be produced by a known casting process, such as an ingot making and blooming process or a thin slab continuous casting process. When the slab is hot-rolled after casting, the slab may be reheated in a furnace before rolling or, if a predetermined temperature or higher is maintained, may be subjected to direct rolling without being heated.

The steel material thus produced is subjected to rough rolling and finish rolling. In the disclosed embodiments, carbide in the steel material must be dissolved before rough rolling. When the slab is heated, the slab is preferably heated to 1100° C. or more to dissolve carbides and prevent an increase in rolling force. The slab is preferably heated to 1300° C. or less to prevent an increase in scale loss. As described above, when the steel material before rough rolling has a predetermined temperature or more and when carbides in the steel material are dissolved, the steel material is not necessarily heated before rough rolling. The rough rolling conditions need not be particularly limited.

Cumulative Strain in the Final Two Rolling Stages in the Hot-Rolling Step: 0.10 to 0.80

The phrase "a cumulative strain in the final two rolling stages", as used herein, refers to the cumulative rolling reduction of the final two stages in multistage finishing rolling in which continuous three or more (for example, six or seven) rolling stages are performed. The final two stages are, for example, the sixth stage and the seventh stage in continuous seven rolling stages. At a cumulative strain of less than 0.10, the average grain size of crystal grains containing an oxide in a region within 4.9 μm in a thickness direction from a surface of a steel sheet exceeds 10 μm, and therefore the heat-affected zone has lower toughness. Furthermore, the average grain size of crystal grains containing an oxide in a region within 15.0 μm in a thickness direction from a surface of a steel sheet exceeds 10 μm, and therefore the heat-affected zone has lower toughness. On the other hand, at a cumulative strain of more than 0.80, the average grain size of crystal grains including an oxidized portion in the region within 4.9 μm in the thickness direction from the surface of the steel sheet is less than 3 μm due to excessive nucleation. Furthermore, the average grain size of crystal grains including an oxidized portion in the region within 15.0 μm in the thickness direction from the surface of the steel sheet is less than 3 μm. Thus, the cumulative strain in the final two rolling stages ranges from 0.10 to 0.80. The term "strain", as used herein, refers to a nominal strain.

Coiling Temperature: 470° C. to 800° C.

At a coiling temperature of less than 470° C., the ferrite area fraction exceeds 20%, and a weld heat affected zone is softened. On the other hand, a coiling temperature of more than 800° C. results in an average grain size of more than 10 μm due to the growth of crystal grains containing an oxide of Si and/or Mn in the region within 4.9 μm in the thickness direction from the surface of the steel sheet. Thus, the coiling temperature ranges from 470° C. to 800° C. The coiling temperature is preferably 500° C. or more. The coiling temperature is preferably 700° C. or less. In order that the lowest Si concentration $L_{Si}$ and the lowest Mn concentration $L_{Mn}$ in the region within 15.0 μm in the thickness direction from the surface of the steel sheet and the Si concentration $T_{Si}$ and the Mn concentration $T_{Mn}$ at a quarter thickness position of the steel sheet satisfy the formula (1), the coiling temperature ranges from 470° C. to 800° C.

A hot-rolled steel sheet formed in the hot-rolling step is cold-rolled. The rolling reduction in the cold-rolling is preferably, but is not limited to, in the range of 30% to 75%.

Soaking Conditions while Annealing: A Dew-Point Temperature in the Range of −50° C. to 0° C. or a Dew-Point Temperature in the Range of −50° C. to 20° C., Soaking Temperature: 750° C. to 900° C.

An annealing temperature of less than 750° C. results in residual non-recrystallized grains and lower toughness. On the other hand, an annealing temperature of more than 900° C. results in a fresh martensite area fraction of more than 15% and a heat-affected zone with lower toughness. When the dew-point temperature in annealing is not in the range of −50° C. to 0° C., the lowest Si concentration $L_{Si}$ and the lowest Mn concentration $L_{Mn}$ in a region within 4.9 μm in a thickness direction from a surface of a steel sheet and the Si concentration $T_{Si}$ and the Mn concentration $T_{Mn}$ at a quarter thickness position of the steel sheet do not satisfy $L_{Si}+L_{Mn} \leq (T_{Si}+T_{Mn})/5$. Thus, the dew-point temperature ranges from −50° C. to 0° C., and the annealing temperature ranges from 750° C. to 900° C. In order that the lowest Si concentration $L_{Si}$ and the lowest Mn concentration $L_{Mn}$ in the region within 15.0 μm in the thickness direction from the surface of the steel sheet and the Si concentration $T_{Si}$ and the Mn concentration $T_{Mn}$ at a quarter thickness position of the steel sheet satisfy the formula (1), the dew-point temperature should range from −50° C. to 20° C.

Cooling Stop Temperature: 150° C. to 340° C.

Cooling from the soaking rate to the temperature range of less than 150° C. results in a retained austenite area fraction of less than 8%. On the other hand, cooling to the temperature range of more than 340° C. results in a fresh martensite area fraction of more than 15%. Furthermore, cooling to the temperature range of more than 340° C. may result in a fraction of fresh martensite and retained austenite adjacent to ferrite exceeding 90%. Thus, a weld tends to have a crack. Thus, the cooling stop temperature ranges from 150° C. to 340° C.

Bending and Unbending Three to Eight Times in Total with a Roller with a Radius in the Range of 100 to 1000 mm while Cooling from the Annealing Temperature to the Cooling Stop Temperature A desired microstructure cannot be formed only by simple cooling. Bending strain is introduced around a surface of a steel sheet by bending and unbending three to eight times in total with a roller with a radius in the range of 100 to 1000 mm while cooling from the annealing temperature to the cooling stop temperature. When the bending and unbending are performed three or more times in total, the lowest Si concentration $L_{Si}$ and the lowest Mn concentration $L_{Mn}$ in a region within 4.9 μm in a thickness direction from a surface of a steel sheet and the Si concentration $T_{Si}$ and the Mn concentration $T_{Mn}$ at a quarter thickness position of the steel sheet satisfy $L_{Si}+L_{Mn} \leq (T_{Si}+T_{Mn})/5$, and high LME resistance and good weld fatigue properties can be achieved. Furthermore, when the bending and unbending are performed three or more times in total, the lowest Si concentration $L_{Si}$ and the lowest Mn concentration $L_{Mn}$ in a region within 15.0 μm in a thickness direction from a surface of a steel sheet and the Si concentration $T_{Si}$ and the Mn concentration $T_{Mn}$ at a quarter thickness position of the steel sheet also satisfy $L_{Si}+L_{Mn} \leq (T_{Si}+T_{Mn})/5$, and high LME resistance and good weld fatigue properties can be achieved. The total number of times of the bending and unbending is preferably four or more times. The effect is saturated when the total number of times of the bending and unbending is eight or more times. Thus, in the disclosed embodiments, the total number is eight times or less, preferably seven times or less. To produce the effect, an appropriate bending strain must be introduced around the surface of a steel sheet using a roller with a radius of 1000 mm or less. A roller with a radius of less than 100 mm, however, introduces a too large bending strain and cannot produce the effects. Thus, a roller with a radius in the range of 100 to 1000 mm was used. The number of times of bending and unbending is not the number of bending and unbending cycles but the sum of the number of times of bending and the number of times of unbending.

Reheating Temperature: 350° C. to 600° C.

A steel sheet after annealing is reheated to the temperature range of 350° C. to 600° C. Reheating in the temperature range of less than 350° C. results in a total area fraction of bainite and tempered martensite of less than 50% and a weld with lower toughness. On the other hand, reheating to more than 600° C. results in an increased ferrite area fraction and an area fraction of fresh martensite and retained austenite adjacent only to the ferrite phase exceeding 90%. Thus, the reheating temperature ranges from 350° C. to 600° C.

A method for producing a steel sheet according to the disclosed embodiments preferably includes a plating step of performing hot-dip galvanizing or hot-dip galvannealing on a steel sheet after the reheating step. In the treatment of performing hot-dip galvanizing on a steel sheet, annealing and hot-dip galvanizing treatment may be performed with an apparatus configured to continuously perform annealing and hot-dip galvanizing treatment. To perform hot-dip galvanizing on a steel sheet, preferably, the steel sheet is immersed in a galvanizing bath in the temperature range of 440° C. to 500° C. to perform hot-dip galvanizing treatment, and then the coating weight is adjusted by gas wiping or the like. For the hot-dip galvanizing, it is preferable to use a galvanizing bath having a composition with an Al content in the range of 0.10% to 0.23% by mass and the remainder composed of Zn and incidental impurities. To perform hot-dip galvannealing on a steel sheet, the steel sheet is preferably subjected to hot-dip galvanizing treatment and then galvannealing treatment in the temperature range of 450° C. to 600° C. An alloying temperature of less than 450° C. may result in an excessively low Zn—Fe alloying rate and make alloying very difficult. On the other hand, an alloying temperature of more than 600° C. may result in transformation of untransformed austenite into pearlite and lower TS and ductility. Thus, to perform galvannealing treatment, alloying treatment is preferably performed in the temperature range of 450° C. to 600° C., more preferably 470° C. or more, and more preferably 550° C. or less, still more preferably 530° C. or less.

Furthermore, the coating weight of a hot-dip galvanized steel sheet (GI) and a hot-dip galvannealed steel sheet (GA) preferably ranges from 20 to 80 g/m² per side (plating on both sides). The coating weight can be adjusted by gas wiping or the like after galvanization.

A steel sheet plated as described above may be cooled to 50° C. or less and then rolled at an elongation percentage in the range of 0.05% to 1.00%. The elongation percentage of the rolling after cooling to 50° C. or less more preferably ranges from 0.10% to 0.70%.

The rolling after cooling to 50° C. or less may be performed with an apparatus coupled to a plating equipment for the galvanizing treatment (on-line) or with an equipment separated from the plating equipment for the galvanizing treatment (off-line). Rolling may be performed once to achieve the desired elongation percentage or multiple times to achieve a total elongation percentage in the range of 0.05% to 1.00%. The rolling described herein typically refers to temper rolling but may be rolling by a method such as processing with a leveler that can achieve an elongation percentage equivalent to that of temper rolling.

Production conditions other than those described above may be usual conditions.

Second Embodiment

Next, a second embodiment of a method for producing a steel sheet according to the disclosed embodiments is described below. The second embodiment of a method for producing a steel sheet according to the disclosed embodiments includes a hot-rolling step of hot-rolling a steel slab with the above chemical composition at a cumulative strain in the range of 0.10 to 0.80 in the final two rolling stages followed by coiling at a coiling temperature in the range of 470° C. to 800° C., a cold-rolling step of cold-rolling a hot-rolled steel sheet formed in the hot-rolling step, an annealing step of holding a cold-rolled steel sheet formed in the cold-rolling step at a dew-point temperature in the range of −50° C. to 0° C. and at an annealing temperature in the range of 750° C. to 900° C., cooling the cold-rolled steel sheet to a cooling stop temperature in the range of 350° C. to 500° C., and bending and unbending the cold-rolled steel sheet three to eight times in total with a roller with a radius in the range of 100 to 1000 mm while cooling from the annealing temperature to the cooling stop temperature, a plating step of performing hot-dip galvanizing or hot-dip galvannealing on the steel sheet after the annealing step, and a reheating step of cooling the steel sheet after the plating step to a cooling stop temperature in the range of 50° C. to 350° C., reheating the steel sheet to a temperature exceeding the cooling stop temperature and in the range of 300° C. to 500° C., and holding the temperature.

The second embodiment of a method for producing a steel sheet according to the disclosed embodiments includes a hot-rolling step of hot-rolling a steel slab with the above chemical composition at a cumulative strain in the range of 0.10 to 0.80 in the final two rolling stages followed by coiling at a coiling temperature in the range of 470° C. to 800° C., a cold-rolling step of cold-rolling a hot-rolled steel sheet formed in the hot-rolling step, an annealing step of holding a cold-rolled steel sheet formed in the cold-rolling step at a dew-point temperature in the range of −50° C. to 20° C. and at an annealing temperature in the range of 750° C. to 900° C., cooling the cold-rolled steel sheet to a cooling stop temperature in the range of 350° C. to 500° C., and bending and unbending the cold-rolled steel sheet three to eight times in total with a roller with a radius in the range of 100 to 1000 mm while cooling from the annealing temperature to the cooling stop temperature, a plating step of performing hot-dip galvanizing or hot-dip galvannealing on the steel sheet after the annealing step, and a reheating step of cooling the steel sheet after the plating step to a cooling stop temperature in the range of 50° C. to 350° C., reheating the steel sheet to a temperature exceeding the cooling stop temperature and in the range of 300° C. to 500° C., and holding the temperature.

In the description of the second embodiment, only the conditions different from those of the first embodiment are described.

Cooling Stop Temperature after Annealing: 350° C. to 500° C.

In the second embodiment, a cold-rolled steel sheet is held in the temperature range of 750° C. to 900° C. in an atmosphere with a dew-point temperature in the range of −50° C. to 0° C., is cooled to a cooling stop temperature in the range of 350° C. to 500° C., and is bent and unbent three to eight times in total with a roller with a radius in the range of 100 to 1000 mm while cooling from the annealing temperature to the cooling stop temperature. In the second embodiment, unlike the first embodiment, the annealing is followed by cooling to a cooling stop temperature in the range of 350° C. to 500° C. In the second embodiment, to reduce the transformation of the microstructure before the plating step, the cooling stop temperature is 350° C. or more. Furthermore, to reduce the formation of pearlite and set the retained austenite volume fraction in a desired range, the cooling stop temperature is 500° C. or less.

Cooling Stop Temperature when a Steel Sheet is Cooled after the Plating Step: 50° C. to 350° C.

The second embodiment includes the plating step after the annealing step, and the reheating step of cooling the steel sheet after the plating step to a cooling stop temperature in the range of 50° C. to 350° C., reheating the steel sheet to a temperature exceeding the cooling stop temperature and in the range of 300° C. to 500° C., and holding the temperature. In the reheating step, as described above, the plating step is followed by cooling the steel sheet to a cooling stop temperature in the range of 50° C. to 350° C. A cooling stop temperature of less than 50° C. results in a retained austenite area fraction of less than 8%. On the other hand, a cooling stop temperature of more than 350° C. results in a fresh martensite area of more than 15%. A cooling stop temperature of more than 350° C. results in a fraction of fresh martensite and retained austenite adjacent to ferrite exceeding 90%. Thus, a weld tends to have a crack.

Thus, the cooling stop temperature ranges from 50° C. to 350° C. The cooling stop temperature is preferably 100° C. or more, more preferably 150° C. or more. The cooling stop temperature is preferably 300° C. or less, more preferably 270° C. or less.

Reheating Temperature: Higher than Cooling Stop Temperature and in the Range of 300° C. to 500° C.

Holding at a reheating temperature exceeding the cooling stop temperature and in the range of 300° C. to 500° C. can distribute carbon from martensite formed at the time of cooling stop to untransformed austenite and achieve the retained austenite volume fraction in a desired range. The term "cooling stop temperature", as used herein, refers to a cooling stop temperature of a steel sheet cooled before reheating.

The average cooling rate, the cooling stop temperature, and the cooling method after holding at the reheating temperature are not particularly limited. The cooling method may be gas jet cooling, mist cooling, roll cooling, water cooling, air cooling, or the like. To prevent oxidation of the surface of a steel sheet, after holding at the reheating temperature, the steel sheet is preferably cooled to 50° C. or less, more preferably approximately room temperature. The average cooling rate of the cooling typically ranges from 1° C./s to 50° C./s.

In a series of heat treatment in a production method according to the disclosed embodiments described above, the holding temperature may vary in the temperature range described above. The cooling rate while cooling may also vary in a specified range without departing from the gist of the disclosed embodiments. A steel sheet may be heat-treated in any facility provided that the thermal history is satisfied.

Next, a member according to the disclosed embodiments and a method for producing the member are described below.

A member according to the disclosed embodiments is produced by performing at least one of forming and welding on a steel sheet according to embodiments. A method for producing a member according to the disclosed embodiments includes the step of performing at least one of forming and welding on a steel sheet produced by a method for producing a steel sheet according to embodiments.

A steel sheet according to the disclosed embodiments has not only a tensile strength (TS) of 1180 MPa or more and high strength but also high LME resistance. Furthermore, a steel sheet according to the disclosed embodiments has good fatigue properties, can reduce a decrease in weld fatigue strength, and can sufficiently maintain collision strength. Thus, a member produced from a steel sheet according to the disclosed embodiments is suitable for transportation vehicles, such as automobiles.

The forming may be any typical processing method, such as press forming. The welding may be any typical welding, such as spot welding or arc welding.

EXAMPLES

Example 1

The disclosed embodiments are more specifically described with reference to examples. The scope of the disclosure is not intended to be limited to the following examples.

A steel material with the chemical composition listed in Table 1 and with the remainder composed of Fe and incidental impurities was obtained by steelmaking in a converter and was formed into a steel slab in a continuous casting method. The steel slab was heated to 1250° C. and was subjected to rough rolling. The steel was then subjected to finish rolling at a finish rolling temperature of 900° C. and was coiled at a coiling temperature listed in Table 2 as a hot-rolled steel sheet. The hot-rolled steel sheet was then subjected to a cold-rolling step and an annealing step under the conditions shown in Table 2 to produce a cold-rolled steel sheet (CR).

As described below, a steel sheet was then produced through the production process according to a first embodiment or a second embodiment.

In the first embodiment, the annealing step was followed by the reheating step under the conditions shown in Table 2. Some of the steel sheets were then subjected to plating treatment to produce steel sheets of the types shown in Table 2.

In the second embodiment, the annealing step was followed by plating treatment to produce steel sheets of the types shown in Table 2. A reheating step was then performed under the conditions shown in Table 2 to produce a steel sheet.

In a working example of the first embodiment, the cooling stop temperature after annealing in the annealing step ranges from 150° C. to 340° C., as shown in Table 2. In a working example of the second embodiment, the cooling stop temperature after annealing in the annealing step ranges from 350° C. to 500° C., as shown in Table 2.

In the plating step, a steel sheet was subjected to plating treatment to produce a hot-dip galvanized steel sheet (GI) or a hot-dip galvannealed steel sheet (GA). To produce GI, the hot-dip galvanizing bath was a zinc bath containing Al: 0.20% by mass and the remainder composed of Zn and incidental impurities. To produce GA, a zinc bath containing Al: 0.14% by mass and the remainder composed of Zn and incidental impurities was used. The bath temperature was 470° C. for both GI and GA production. The coating weight ranged from approximately 45 to 72 g/m² per side (plating on both sides) to produce GI and was approximately 45 g/m² per side (plating on both sides) to produce GA. Alloying treatment to produce GA was performed at 500° C. The composition of the coated layer of GI contained Fe: 0.1% to 1.0% by mass, Al: 0.2% to 1.0% by mass, and the remainder composed of Zn and incidental impurities. The composition of the coated layer of GA contained Fe: 7% to 15% by mass, Al: 0.1% to 1.0% by mass, and the remainder composed of Zn and incidental impurities.

TABLE 1

| Steel symbol | Chemical composition (mass %) | | | | | | | | |
|---|---|---|---|---|---|---|---|---|---|
| | C | Si | Mn | P | S | Al | N | Others | Ceq(%) |
| A | 0.183 | 1.45 | 2.83 | 0.01 | 0.001 | 0.03 | 0.003 | Ti: 0.022, B: 0.0013 | 0.715 |
| B | 0.175 | 1.52 | 2.75 | 0.01 | 0.001 | 0.03 | 0.004 | Sb: 0.005, Ti: 0.025, B: 0.0015 | 0.697 |
| C | 0.172 | 1.54 | 2.78 | 0.02 | 0.002 | 0.04 | 0.003 | V: 0.01, Zr: 0.07 | 0.700 |
| E | 0.192 | 0.95 | 2.72 | 0.02 | 0.003 | 0.04 | 0.004 | Cr: 0.25 | 0.735 |
| F | 0.122 | 1.72 | 3.82 | 0.02 | 0.001 | 0.04 | 0.005 | — | 0.830 |
| G | 0.185 | 1.96 | 2.85 | 0.02 | 0.018 | 0.03 | 0.007 | Ni: 0.009 | 0.742 |
| H | 0.189 | 1.51 | 2.82 | 0.01 | 0.001 | 0.03 | 0.003 | Mo: 0.15, Sn: 0.010 | 0.729 |
| I | 0.181 | 1.52 | 2.89 | 0.01 | 0.001 | 0.04 | 0.004 | Nb: 0.02 | 0.726 |
| K | 0.165 | 1.52 | 2.56 | 0.02 | 0.003 | 0.04 | 0.004 | — | 0.655 |
| L | 0.192 | 1.53 | 2.85 | 0.01 | 0.001 | 0.03 | 0.005 | Pb: 0.004, Cs: 0.006 | 0.731 |
| M | 0.183 | 2.12 | 2.76 | 0.02 | 0.002 | 0.03 | 0.005 | — | 0.731 |
| N | 0.175 | 0.21 | 2.75 | 0.01 | 0.001 | 0.05 | 0.003 | — | 0.642 |
| O | 0.198 | 1.45 | 2.90 | 0.02 | 0.002 | 0.03 | 0.005 | Ta: 0.002, Hf: 0.004 | 0.742 |
| P | 0.178 | 1.52 | 4.06 | 0.01 | 0.002 | 0.04 | 0.004 | — | 0.918 |
| Q | 0.185 | 1.46 | 2.76 | 0.01 | 0.015 | 0.05 | 0.004 | As: 0.006, Cu: 0.02, Ni: 0.04 | 0.707 |
| R | 0.175 | 1.51 | 2.84 | 0.02 | 0.001 | 0.04 | 0.005 | REM: 0.024 | 0.711 |
| S | 0.169 | 1.48 | 2.85 | 0.01 | 0.001 | 0.06 | 0.003 | W: 0.006, Ti: 0.020, B: 0.0025 | 0.706 |
| T | 0.176 | 1.42 | 2.87 | 0.01 | 0.002 | 0.03 | 0.005 | Zn: 0.05, V: 0.05 | 0.717 |
| U | 0.172 | 1.82 | 2.75 | 0.02 | 0.003 | 0.09 | 0.004 | Ca: 0.003, Ti: 0.018, B: 0.0028 | 0.706 |
| V | 0.178 | 1.85 | 2.78 | 0.02 | 0.002 | 0.04 | 0.007 | Co: 0.015 | 0.718 |
| W | 0.180 | 0.45 | 2.77 | 0.01 | 0.001 | 0.06 | 0.003 | Sn: 0.002, Cu: 0.02 | 0.660 |
| X | 0.173 | 1.52 | 3.66 | 0.02 | 0.002 | 0.05 | 0.004 | Mg: 0.0004, Zr: 0.09 | 0.846 |
| Y | 0.178 | 1.53 | 2.71 | 0.02 | 0.001 | 0.05 | 0.005 | Sr: 0.008 | 0.693 |
| Z | 0.386 | 0.32 | 2.71 | 0.02 | 0.001 | 0.05 | 0.005 | — | 0.851 |

TABLE 2

| | | Hot-rolling step | | Cold-rolling step | Annealing step | | |
|---|---|---|---|---|---|---|---|
| No. | Steel symbol | Cumulative strain in final two rolling stages | Coiling temperature (° C.) | Rolling reduction (%) | Dew-point temperature (° C.) | Annealing temperature (° C.) | Cooling stop temperature (° C.) |
| 1 | A | 0.50 | 600 | 50 | −5 | 800 | 200 |
| 2 | A | 0.50 | 600 | 50 | −15 | 805 | 200 |
| 3 | A | 0.50 | 600 | 50 | −15 | 805 | 480 |

TABLE 2-continued

| No. | | | | | | | |
|---|---|---|---|---|---|---|---|
| 4 | A | 0.50 | 600 | 50 | 6 | 800 | 200 |
| 5 | A | 0.50 | 600 | 50 | −55 | 800 | 200 |
| 6 | A | 0.50 | 450 | 50 | −15 | 800 | 200 |
| 7 | A | 0.50 | 830 | 50 | −15 | 800 | 200 |
| 8 | B | 0.40 | 610 | 45 | −15 | 795 | 205 |
| 9 | B | 0.40 | 610 | 45 | −35 | 795 | 205 |
| 10 | B | 0.40 | 610 | 45 | −35 | 795 | 410 |
| 11 | C | 0.60 | 610 | 45 | −15 | 795 | 205 |
| 12 | C | 0.60 | 610 | 45 | −35 | 795 | 205 |
| 13 | C | 0.60 | 610 | 45 | −35 | 795 | 360 |
| 14 | C | 0.60 | 610 | 45 | −15 | 795 | 205 |
| 15 | C | 0.60 | 610 | 45 | −15 | 795 | 205 |
| 16 | E | 0.40 | 600 | 50 | −10 | 790 | 180 |
| 17 | E | 0.40 | 600 | 50 | −10 | 745 | 180 |
| 18 | E | 0.40 | 600 | 50 | −10 | 910 | 180 |
| 19 | E | 0.40 | 600 | 50 | −10 | 790 | 140 |
| 20 | E | 0.40 | 600 | 50 | −10 | 790 | 350 |
| 21 | F | 0.20 | 500 | 50 | −10 | 800 | 200 |
| 22 | G | 0.60 | 600 | 45 | −15 | 790 | 200 |
| 23 | H | 0.60 | 580 | 50 | −15 | 840 | 210 |
| 24 | H | 0.04 | 580 | 50 | −15 | 840 | 210 |
| 25 | H | 0.90 | 580 | 50 | −15 | 840 | 210 |
| 26 | I | 0.50 | 610 | 50 | −20 | 795 | 210 |
| 27 | K | 0.50 | 550 | 50 | −20 | 800 | 210 |
| 28 | L | 0.50 | 550 | 50 | −20 | 800 | 210 |
| 29 | L | 0.50 | 550 | 50 | −20 | 800 | 210 |
| 30 | L | 0.50 | 550 | 50 | −20 | 800 | 210 |
| 31 | M | 0.50 | 600 | 50 | −15 | 805 | 210 |
| 32 | N | 0.50 | 600 | 50 | −15 | 805 | 210 |
| 33 | O | 0.50 | 510 | 50 | −5 | 800 | 210 |
| 34 | P | 0.50 | 600 | 50 | −15 | 800 | 205 |
| 35 | Q | 0.50 | 520 | 50 | −25 | 800 | 220 |
| 36 | R | 0.50 | 520 | 40 | −25 | 790 | 220 |
| 37 | S | 0.50 | 520 | 40 | −25 | 780 | 220 |
| 38 | T | 0.50 | 520 | 45 | −25 | 790 | 220 |
| 39 | U | 0.50 | 520 | 50 | −25 | 800 | 220 |
| 40 | V | 0.50 | 520 | 40 | −25 | 800 | 220 |
| 41 | W | 0.50 | 520 | 40 | −25 | 800 | 220 |
| 42 | X | 0.50 | 520 | 40 | −25 | 790 | 220 |
| 43 | Y | 0.50 | 520 | 40 | −25 | 770 | 220 |
| 44 | Z | 0.50 | 520 | 45 | −25 | 780 | 150 |

| | Annealing step Bending and unbending | | Reheating step (first embodiment) | | Reheating step (second embodiment) | | |
|---|---|---|---|---|---|---|---|
| No. | Roller radius (mm) | Count (times) | Reheating temperature (° C.) | Plating step Type | Cooling stop temperature (° C.) | Reheating temperature (° C.) | Thickness (mm) |
| 1 | 450 | 5 | 410 | GA | | | 1.2 |
| 2 | 550 | 5 | 410 | GA | | | 1.4 |
| 3 | 550 | 5 | | GA | 200 | 400 | 1.4 |
| 4 | 450 | 5 | 405 | GA | | | 1.2 |
| 5 | 450 | 5 | 410 | GA | | | 1.2 |
| 6 | 450 | 5 | 405 | GA | | | 1.2 |
| 7 | 450 | 5 | 405 | GA | | | 1.2 |
| 8 | 500 | 6 | 400 | GA | | | 1.2 |
| 9 | 500 | 6 | 400 | GI | | | 1.4 |
| 10 | 500 | 6 | | GA | 200 | 400 | 1.4 |
| 11 | 550 | 6 | 400 | GA | | | 1.0 |
| 12 | 600 | 6 | 400 | GI | | | 1.2 |
| 13 | 600 | 6 | | GA | 300 | 480 | 1.2 |
| 14 | 450 | 2 | 400 | GA | | | 1.4 |
| 15 | 450 | 9 | 400 | GA | | | 1.4 |
| 16 | 550 | 8 | 405 | GA | | | 1.6 |
| 17 | 550 | 8 | 405 | GA | | | 1.4 |
| 18 | 550 | 8 | 405 | GA | | | 1.4 |
| 19 | 550 | 8 | 405 | GA | | | 1.4 |
| 20 | 550 | 8 | 405 | GA | | | 1.4 |
| 21 | 600 | 7 | 400 | GA | | | 1.2 |
| 22 | 450 | 8 | 400 | GA | | | 1.2 |
| 23 | 450 | 7 | 410 | GA | | | 1.4 |
| 24 | 450 | 7 | 410 | GA | | | 1.2 |
| 25 | 450 | 5 | 410 | GA | | | 1.2 |
| 26 | 500 | 5 | 405 | GA | | | 1.4 |
| 27 | 450 | 6 | 410 | GA | | | 1.6 |
| 28 | 450 | 6 | 400 | GA | | | 1.6 |
| 29 | 450 | 6 | 330 | GA | | | 1.2 |
| 30 | 450 | 6 | 610 | GA | | | 1.0 |

TABLE 2-continued

| 31 | 500 | 5 | 405 | GA | 1.2 |
|---|---|---|---|---|---|
| 32 | 550 | 5 | 410 | GA | 1.2 |
| 33 | 500 | 6 | 410 | GA | 1.0 |
| 34 | 600 | 6 | 420 | GA | 1.2 |
| 35 | 600 | 6 | 430 | GA | 1.4 |
| 36 | 550 | 6 | 410 | GA | 1.4 |
| 37 | 500 | 6 | 420 | GA | 1.4 |
| 38 | 450 | 7 | 400 | GA | 1.2 |
| 39 | 450 | 7 | 410 | GA | 1.2 |
| 40 | 425 | 7 | 405 | GA | 1.4 |
| 41 | 450 | 7 | 420 | GA | 1.6 |
| 42 | 450 | 7 | 410 | CR | 1.4 |
| 43 | 450 | 7 | 410 | GI | 1.8 |
| 44 | 500 | 7 | 570 | GI | 1.8 |

The following measurements were performed on each steel sheet.

(1) Microstructure Observation

A thickness cross section of the steel sheet in the rolling direction was polished and corroded with 1% by volume nital. Ten fields in a region from the surface to a ¼t thickness position are photographed with a scanning electron microscope at a magnification of 3000 times. The area fraction of each microstructure is determined using Image-Pro manufactured by Media Cybernetics from image data thus obtained, and the average area fraction in the 10 fields is defined as the area fraction of each microstructure. "t" denotes the thickness of the steel sheet (sheet thickness). In the image data, ferrite is distinguished as black, fresh martensite and retained austenite are distinguished as white or light gray, and tempered martensite and bainite, which contain carbide, are distinguished as dark gray. The fresh martensite area fraction was determined by subtracting the retained austenite area fraction described later from the area fraction of the white or light gray microstructures. For retained austenite, as described later, the volume fraction was determined by X-ray diffractometry and was regarded as an area fraction. A value calculated by subtracting the retained austenite volume fraction determined by X-ray diffractometry from the total area fraction of fresh martensite and retained austenite determined by scanning electron microscope observation was regarded as a fresh martensite area fraction.

The retained austenite volume fraction is measured by the following method. A steel sheet was mechanically ground in the thickness direction (depth direction) to a quarter thickness and was then chemically polished with oxalic acid to form an observation surface. The observation surface was observed by X-ray diffractometry. A Co Kα radiation source was used for incident X-rays. The ratio of the diffraction intensities of (200), (220), and (311) planes of fcc iron (austenite) to the diffraction intensities of (200), (211), and (220) planes of bcc iron was determined as the retained austenite volume fraction.

For the fraction of fresh martensite and retained austenite adjacent to ferrite, the fraction of fresh martensite and retained austenite in contact with ferrite at one or more portions at microstructure boundaries on the observation surface relative to the fresh martensite and the retained austenite was determined as an area fraction.

(2) Measurement of the Average Grain Size of Crystal Grains Containing an Oxide of Si and/or Mn in a Region within 4.9 μm in a Thickness Direction from a Surface of a Steel Sheet SEM observation and energy dispersive X-ray analysis (EDX) on a cross section of a steel sheet (L cross section: a cross section parallel to the rolling direction and perpendicular to the surface of the steel sheet) were performed to determine the type of oxide in the region within 4.9 μm in the thickness direction from the surface of the steel sheet and to measure the average grain size of crystal grains containing an oxide of Si and/or Mn. The average grain size of crystal grains was the average of grain sizes measured by microtomy in a cross section (L cross section) of a steel sheet in a direction parallel to the surface of the steel sheet.

(3) Measurement of the Lowest Si Concentration $L_{Si}$ and the Lowest Mn Concentration $L_{Mn}$ in a Region within 4.9 μm in a Thickness Direction from a Surface of a Steel Sheet and the Si Concentration $T_{Si}$ and the Mn Concentration $T_{Mn}$ at a Quarter Thickness Position of the Steel Sheet The Si concentration $T_{Si}$ and the Mn concentration $T_{Mn}$ at a quarter thickness position of a steel sheet were determined with a field emission-electron probe micro analyzer (FE-EPMA) from the average of 10 points of point analysis at an electron beam diameter of 1 μm at a quarter thickness position of the steel sheet. For the Si concentration in the region within 4.9 μm in the thickness direction from the surface of the steel sheet, the concentration distribution of the Si concentration in the range of 0 to 4.9 μm in the thickness direction from the surface of the steel sheet was determined by line analysis with a field emission-electron probe micro analyzer at an electron beam diameter of 0.1 μm from the surface of the steel sheet in the thickness direction. The lowest Si concentration in the concentration distribution was defined as the concentration $L_{Si}$. Also for the Mn concentration in the region within 4.9 μm in the thickness direction from the surface of the steel sheet, the concentration distribution of the Mn concentration in the range of 0 to 4.9 μm in the thickness direction from the surface of the steel sheet was determined by line analysis with a field emission-electron probe micro analyzer at an electron beam diameter of 0.1 μm from the surface of the steel sheet in the thickness direction. The lowest Mn concentration in the concentration distribution was defined as the concentration $L_{Mn}$. The Si concentration, the Mn concentration, $L_{Si}$, $T_{Si}$, $L_{Mn}$, and $T_{Mn}$ are expressed in % by mass. In the measurement of the Si concentration and the Mn concentration with a field emission-electron probe micro analyzer, 10 positions without particulate matter were measured and averaged as the Si concentration and the Mn concentration.

(4) Method of Measuring Soft Layer

Measurement is performed on the soft layer as described below. After smoothing a thickness cross section (L cross section) parallel to the rolling direction of a steel sheet by wet grinding, measurement was performed with a Vickers hardness tester at a load of 10 gf from a 1-μm position to a 100-μm position in the thickness direction from the surface of the steel sheet at intervals of 1 μm. Measurement was then performed at intervals of 20 μm to the central portion in the thickness direction. A region with hardness corresponding to 65% or less of the hardness at a quarter thickness position is defined as a soft layer, and the thickness of the region in the thickness direction is defined as the thickness of the soft layer.

(5) Tensile Properties

A tensile test according to JIS Z 2241 was performed five times on No. 5 test specimens described in JIS Z 2201 having a longitudinal direction (tensile direction) that formed an angle of 90 degrees with the rolling direction. The average yield strength (YS), tensile strength (TS), and butt elongation (El) were determined. The crosshead speed in the tensile test was 10 mm/min. Table 3 shows the calculation results.

(6) LME Resistance

The LME resistance was determined by a resistance welding cracking test. A test specimen of a steel sheet cut to 30 mm×100 mm in a longitudinal direction perpendicular to the rolling direction and another test specimen made of a 980 MPa grade hot-dip galvanized steel sheet were subjected to resistance welding (spot welding) to produce a member. A set of the two steel sheets tilted 5 degrees was subjected to resistance spot welding in a servomotor pressurization type single-phase alternating current (50 Hz) resistance welding machine attached to a welding gun. The welding conditions included a welding pressure of 3.8 kN and a holding time of 0.2 seconds. The welding current ranged from 5.7 to 6.2 kA, the weld time was 21 cycles, and the holding time was 5 cycles. A test specimen was cut in half from the welded member, and a cross section was observed with an optical microscope. A test specimen with no crack of 0.1 mm or more was judged to be good LME cracking (O), and a test specimen with a crack of 0.1 mm or more was judged to be poor LME cracking (X).

(7) Weld Fatigue Test

First, spot welding was performed under the following conditions. Electrode: DR 6 mm-40R, welding pressure: 4802 N (490 kgf), and weld time: 17 cycles. The current value was adjusted so that the nugget diameter was 6.5 mm, thereby preparing a cross-tension test specimen. A cross-tension test was then performed in accordance with JIS Z 3137. To simulate high-speed collision, the cross head speed was 100 mm/min. A load range of 7000 N or more was judged to be very good (☉), a load range of 5000 N or more and less than 7000 N was judged to be good (O), and a load range of less than 5000 N was judged to be poor (x). Table 3 summarizes the results.

TABLE 3

| No. | Steel symbol | *1 (%) | *2 (%) | *3 (%) | *4 (%) | *5 (%) | *6 (μm) | $L_{Si} + L_{Mn}$ (%) | $(T_{Si} + T_{Mn})/(L_{Si} + L_{Mn})$ | Thickness of soft layer (μm) |
|---|---|---|---|---|---|---|---|---|---|---|
| 1 | A | 72 | 8 | 12 | 6 | 50 | 4 | 0.3 | 14.3 | 30.0 |
| 2 | A | 65 | 9 | 11 | 9 | 55 | 5 | 0.6 | 7.1 | 25.0 |
| 3 | A | 64 | 10 | 11 | 10 | 56 | 5 | 0.6 | 7.1 | 25.0 |
| 4 | A | 60 | 10 | 10 | 15 | 80 | 4 | 2.6 | 1.6 | 12.0 |
| 5 | A | 60 | 10 | 11 | 14 | 78 | 4 | 2.8 | 1.5 | 11.0 |
| 6 | A | 35 | 17 | 13 | 25 | 95 | 5 | 2.7 | 1.6 | 11.0 |
| 7 | A | 60 | 10 | 11 | 10 | 80 | 13 | 2.5 | 1.7 | 15.0 |
| 8 | B | 70 | 7 | 13 | 5 | 60 | 6 | 0.7 | 6.1 | 30.0 |
| 9 | B | 60 | 6 | 16 | 10 | 65 | 6 | 0.8 | 5.3 | 28.0 |
| 10 | B | 61 | 6 | 17 | 10 | 68 | 6 | 0.8 | 5.3 | 28.0 |
| 11 | C | 65 | 7 | 10 | 8 | 65 | 5 | 0.7 | 6.2 | 30.0 |
| 12 | C | 60 | 8 | 10 | 9 | 60 | 5 | 0.8 | 5.4 | 30.0 |
| 13 | C | 65 | 6 | 9 | 10 | 62 | 5 | 0.8 | 5.4 | 30.0 |
| 14 | C | 55 | 9 | 10 | 15 | 80 | 4 | 2.7 | 1.6 | 15.0 |
| 15 | C | 52 | 8 | 10 | 18 | 75 | 4 | 2.9 | 1.5 | 13.0 |
| 16 | E | 68 | 10 | 15 | 5 | 65 | 6 | 0.7 | 5.2 | 35.0 |
| 17 | E | 40 | 17 | 10 | 30 | 95 | 14 | 2.5 | 1.5 | 15.0 |
| 18 | E | 45 | 20 | 11 | 2 | 92 | 12 | 2.6 | 1.4 | 15.0 |
| 19 | E | 42 | 6 | 6 | 42 | 80 | 6 | 2.5 | 1.5 | 18.0 |
| 20 | E | 22 | 18 | 12 | 46 | 95 | 7 | 2.6 | 1.4 | 15.0 |
| 21 | F | 60 | 6 | 9 | 16 | 80 | 6 | 1.0 | 5.5 | 18.0 |
| 22 | G | 55 | 8 | 12 | 13 | 68 | 9 | 0.9 | 5.3 | 15.0 |
| 23 | H | 70 | 6 | 11 | 10 | 70 | 7 | 0.6 | 7.2 | 35.0 |
| 24 | H | 60 | 8 | 6 | 21 | 70 | 11 | 2.8 | 1.5 | 15.0 |
| 25 | H | 73 | 16 | 8 | 2 | 20 | 2 | 2.7 | 1.6 | 16.0 |
| 26 | I | 68 | 8 | 14 | 8 | 65 | 6 | 0.8 | 5.5 | 32.0 |
| 27 | K | 40 | 20 | 4 | 25 | 95 | 2 | 2.8 | 1.5 | 55.0 |
| 28 | L | 60 | 7 | 10 | 15 | 50 | 6 | 0.7 | 6.3 | 40.0 |
| 29 | L | 40 | 10 | 7 | 19 | 60 | 5 | 1.2 | 3.7 | 20.0 |
| 30 | L | 45 | 5 | 5 | 40 | 95 | 6 | 1.4 | 3.1 | 25.0 |
| 31 | M | 55 | 6 | 5 | 30 | 96 | 2 | 3.1 | 1.6 | 16.0 |
| 32 | N | 40 | 17 | 5 | 30 | 80 | 4 | 2.8 | 1.1 | 1.0 |
| 33 | O | 65 | 8 | 12 | 15 | 70 | 5 | 0.5 | 8.7 | 38.0 |
| 34 | P | 60 | 6 | 4 | 28 | 70 | 2 | 2.9 | 1.9 | 12.0 |
| 35 | Q | 55 | 7 | 12 | 15 | 85 | 6 | 0.8 | 5.3 | 31.0 |
| 36 | R | 53 | 6 | 11 | 18 | 69 | 5 | 0.7 | 6.2 | 38.0 |
| 37 | S | 50 | 7 | 13 | 17 | 70 | 6 | 0.8 | 5.4 | 28.0 |
| 38 | T | 56 | 7 | 12 | 16 | 68 | 6 | 0.7 | 6.1 | 35.0 |
| 39 | U | 56 | 8 | 13 | 14 | 65 | 5 | 0.8 | 5.7 | 30.0 |
| 40 | V | 60 | 6 | 11 | 15 | 85 | 4 | 0.8 | 5.8 | 45.0 |
| 41 | W | 62 | 14 | 8 | 13 | 85 | 5 | 0.6 | 5.4 | 48.0 |
| 42 | X | 58 | 6 | 8 | 19 | 82 | 3 | 1.0 | 5.2 | 35.0 |
| 43 | Y | 60 | 6 | 8 | 19 | 85 | 5 | 0.8 | 5.1 | 40.0 |

TABLE 3-continued

| | | | | | | | | | | |
|---|---|---|---|---|---|---|---|---|---|---|
| 44 | Z | 55 | 11 | 14 | 5 | 45 | 5 | 0.6 | 5.1 | 40.0 |

| No. | YS (MPa) | TS (MPa) | EI (%) | LME cracking resistance | Weld fatigue test | Notes |
|---|---|---|---|---|---|---|
| 1 | 920 | 1200 | 14.7 | ○ | ⊙ | Working example |
| 2 | 930 | 1280 | 14.2 | ○ | ⊙ | Working example |
| 3 | 928 | 1283 | 14.1 | ○ | ⊙ | Working example |
| 4 | 900 | 1185 | 14.4 | X | X | Comparative example |
| 5 | 940 | 1240 | 13.2 | X | X | Comparative example |
| 6 | 960 | 1255 | 12.9 | X | X | Comparative example |
| 7 | 915 | 1195 | 13.6 | X | X | Comparative example |
| 8 | 900 | 1185 | 15.0 | ○ | ⊙ | Working example |
| 9 | 905 | 1188 | 14.9 | ○ | ⊙ | Working example |
| 10 | 900 | 1190 | 14.8 | ○ | ⊙ | Working example |
| 11 | 915 | 1215 | 14.6 | ○ | ⊙ | Working example |
| 12 | 920 | 1220 | 14.5 | ○ | ⊙ | Working example |
| 13 | 915 | 1215 | 14.2 | ○ | ⊙ | Working example |
| 14 | 910 | 1213 | 14.1 | X | X | Comparative example |
| 15 | 905 | 1220 | 12.5 | X | X | Comparative example |
| 16 | 920 | 1225 | 15.2 | ○ | ⊙ | Working example |
| 17 | 945 | 1230 | 12.5 | X | X | Comparative example |
| 18 | 940 | 1250 | 13.8 | X | X | Comparative example |
| 19 | 620 | 950 | 18.2 | X | X | Comparative example |
| 20 | 610 | 930 | 17.8 | X | X | Comparative example |
| 21 | 880 | 1180 | 14.9 | ○ | ○ | Working example |
| 22 | 910 | 1195 | 14.6 | ○ | ○ | Working example |
| 23 | 910 | 1210 | 15.3 | ○ | ⊙ | Working example |
| 24 | 900 | 1175 | 14.2 | X | X | Comparative example |
| 25 | 905 | 1178 | 14.1 | X | X | Comparative example |
| 26 | 908 | 1190 | 15.2 | ○ | ⊙ | Working example |
| 27 | 610 | 940 | 17.2 | ○ | X | Comparative example |
| 28 | 910 | 1200 | 14.5 | ○ | ⊙ | Working example |
| 29 | 750 | 1050 | 15.9 | X | X | Comparative example |
| 30 | 710 | 1020 | 16.3 | X | X | Comparative example |
| 31 | 920 | 1235 | 13.7 | X | X | Comparative example |
| 32 | 905 | 1210 | 14.6 | ○ | X | Comparative example |
| 33 | 925 | 1240 | 14.9 | ○ | ⊙ | Working example |
| 34 | 915 | 1230 | 13.8 | X | X | Comparative example |
| 35 | 890 | 1185 | 14.7 | ○ | ○ | Working example |
| 36 | 885 | 1190 | 14.5 | ○ | ○ | Working example |
| 37 | 890 | 1200 | 14.3 | ○ | ⊙ | Working example |
| 38 | 910 | 1220 | 14.5 | ○ | ⊙ | Working example |
| 39 | 895 | 1205 | 14.6 | ○ | ⊙ | Working example |
| 40 | 880 | 1192 | 14.8 | ○ | ○ | Working example |
| 41 | 895 | 1183 | 14.9 | ○ | ○ | Working example |
| 42 | 900 | 1210 | 14.6 | ○ | ○ | Working example |
| 43 | 894 | 1203 | 14.8 | ○ | ○ | Working example |
| 44 | 1260 | 1490 | 13.5 | ○ | ○ | Working example |

*1: the total area fraction of bainite and tempered martensite,
*2: fresh martensite area fraction,
*3: retained austenite area fraction,
*4: ferrite area fraction,
*5: the fraction of fresh martensite and retained austenite adjacent to ferrite relative to the total area fraction of fresh martensite and retained austenite,
*6: the average grain size of crystal grains containing an oxide of Si and/or Mn in a region within 4.9 μm in a thickness direction from a surface of a steel sheet As shown in Table 3, the working examples have a TS of 1180 MPa or more and have high LME resistance and good weld fatigue properties. By contrast, the comparative examples were inferior to the working examples in at least one of these.

Example 2

A galvanized steel sheet subjected to galvanizing treatment under the production conditions No. 1 (working example) shown in Table 2 of Example 1 was pressed to produce a member of a working example. Furthermore, a galvanized steel sheet subjected to a galvanizing treatment under the production conditions No. 1 (working example) in Table 2 of Example 1 and a galvanized steel sheet subjected to a galvanizing treatment under the production conditions No. 8 (working example) in Table 2 of Example 1 were joined by spot welding to produce a member of a working example. The members according to the working examples have high LME cracking resistance rated as "O", and cross-tension test specimens taken from the members also have good ratings "⊙" in a weld fatigue test. Thus, these members are suitable for automotive parts and the like.

Example 3

The disclosed embodiments are more specifically described with reference to examples. The scope of the disclosure is not limited to be limited to the following examples.

A steel material with the chemical composition of the steel A or the steel C listed in Table 1 and with the remainder composed of Fe and incidental impurities was obtained by steelmaking in a converter and was formed into a steel slab in a continuous casting process. The steel slab was heated to 1250° C. and was subjected to rough rolling. The steel was then subjected to finish rolling at a finish rolling temperature of 900° C. and was coiled at a coiling temperature listed in Table 4 as a hot-rolled steel sheet. The hot-rolled steel sheet was then subjected to a cold-rolling step and an annealing step under the conditions shown in Table 4 to produce a cold-rolled steel sheet (CR).

As described below, a steel sheet was then produced through the production process according to a first embodiment or a second embodiment.

In the first embodiment, the annealing step was followed by the reheating step under the conditions shown in Table 4. Some of the steel sheets were then subjected to plating treatment to produce steel sheets of the types shown in Table 4.

In the second embodiment, the annealing step was followed by plating treatment to produce steel sheets of the types shown in Table 4. A reheating step was then performed under the conditions shown in Table 4 to produce a steel sheet.

In a working example of the first embodiment, the cooling stop temperature after annealing in the annealing step ranges from 150° C. to 340° C., as shown in Table 4. In a working example of the second embodiment, the cooling stop temperature after annealing in the annealing step ranges from 350° C. to 500° C., as shown in Table 4.

In the plating step, a steel sheet was subjected to plating treatment to produce a hot-dip galvanized steel sheet (GI) or a hot-dip galvannealed steel sheet (GA). To produce GI, the hot-dip galvanizing bath was a zinc bath containing Al: 0.20% by mass and the remainder composed of Zn and incidental impurities. To produce GA, a zinc bath containing Al: 0.14% by mass and the remainder composed of Zn and incidental impurities was used. The bath temperature was 470° C. for both GI and GA production. The coating weight ranged from approximately 45 to 72 g/m² per side (plating on both sides) to produce GI and was approximately 45 g/m² per side (plating on both sides) to produce GA. Alloying treatment to produce GA was performed at 500° C. The composition of the coated layer of GI contained Fe: 0.1% to 1.0% by mass, Al: 0.2% to 1.0% by mass, and the remainder composed of FeZn and incidental impurities. The composition of the coated layer of GA contained Fe: 7% to 15% by mass, Al: 0.1% to 1.0% by mass, and the remainder composed of FeZn and incidental impurities.

TABLE 4

| | | Hot-rolling step | | Cold-rolling step | Annealing step | | |
|---|---|---|---|---|---|---|---|
| No. | Steel symbol | Cumulative strain in final two rolling stages | Coiling temperature (° C.) | Rolling reduction (%) | Dew-point temperature (° C.) | Annealing temperature (° C.) | Cooling stop temperature (° C.) |
| 45 | C | 0.60 | 600 | 45 | 10 | 790 | 200 |
| 46 | C | 0.60 | 600 | 45 | 5 | 795 | 350 |
| 47 | A | 0.50 | 595 | 50 | 12 | 805 | 200 |
| 48 | A | 0.50 | 595 | 50 | 8 | 805 | 480 |

| | Annealing step Bending and unbending | | Reheating step (first embodiment) | | Reheating step (second embodiment) | | |
|---|---|---|---|---|---|---|---|
| No. | Roller radius (mm) | Count (times) | Reheating temperature (° C.) | Plating step Type | Cooling stop temperature (° C.) | Reheating temperature (° C.) | Thickness (mm) |
| 45 | 550 | 6 | 410 | GA | | | 1.0 |
| 46 | 600 | 6 | | GA | 300 | 480 | 1.2 |
| 47 | 550 | 5 | 410 | GA | | | 1.4 |
| 48 | 550 | 5 | | GA | 200 | 400 | 1.4 |

The following measurements were performed on each steel sheet.

(1) Microstructure Observation

A thickness cross section of the steel sheet in the rolling direction was polished and corroded with 1% by volume nital. Ten fields in a region from the surface to a ¼t thickness position are photographed with a scanning electron microscope at a magnification of 3000 times. The area fraction of each microstructure is determined using Image-Pro manufactured by Media Cybernetics from image data thus obtained, and the average area fraction in the 10 fields is defined as the area fraction of each microstructure. "t" denotes the thickness of the steel sheet (sheet thickness). In the image data, ferrite is distinguished as black, fresh martensite and retained austenite are distinguished as white or light gray, and tempered martensite and bainite, which contain carbide, are distinguished as dark gray. The fresh martensite area fraction was determined by subtracting the retained austenite area fraction described later from the area percentage of the white or light gray microstructures. For retained austenite, as described later, the volume fraction was determined by X-ray diffractometry and was regarded as an area fraction. A value calculated by subtracting the retained austenite volume fraction determined by X-ray diffractometry from the total area fraction of fresh martensite and retained austenite determined by scanning electron microscope observation was regarded as a fresh martensite area fraction.

The retained austenite volume fraction is measured by the following method. A steel sheet was mechanically ground in the thickness direction (depth direction) to a quarter thickness and was then chemically polished with oxalic acid to form an observation surface. The observation surface was observed by X-ray diffractometry. A Co Kα radiation source was used for incident X-rays. The ratio of the diffraction intensities of (200), (220), and (311) planes of fcc iron (austenite) to the diffraction intensities of (200), (211), and (220) planes of bcc iron was determined as the retained austenite volume fraction.

For the fraction of fresh martensite and retained austenite adjacent to ferrite, the fraction of fresh martensite and retained austenite in contact with ferrite at one or more portions at microstructure boundaries on the observation surface relative to the fresh martensite and the retained austenite was determined as an area fraction.

(2) Measurement of the Average Grain Size of Crystal Grains Containing an Oxide of Si and/or Mn in a Region within 15.0 μm in a Thickness Direction from a Surface of a Steel Sheet SEM observation and energy dispersive X-ray analysis (EDX) on a cross section of a steel sheet (L cross section: a cross section parallel to the rolling direction and perpendicular to the surface of the steel sheet) were performed to determine the type of oxide in the region within 15.0 μm in the thickness direction from the surface of the steel sheet and to measure the average grain size of crystal grains containing an oxide of Si and/or Mn. The average grain size of crystal grains was the average of grain sizes measured by microtomy in a cross section (L cross section) of a steel sheet in a direction parallel to the surface of the steel sheet.

(3) Measurement of the Lowest Si Concentration $L_{Si}$ and the Lowest Mn Concentration $L_{Mn}$ in a Region within 15.0 μm in a Thickness Direction from a Surface of a Steel Sheet and the Si Concentration $T_{Si}$ and the Mn Concentration $T_{Mn}$ at a Quarter Thickness Position of the Steel Sheet The Si concentration $T_{Si}$ and the Mn concentration $T_{Mn}$ at a quarter thickness position of a steel sheet were determined with a field emission-electron probe micro analyzer (FE-EPMA) from the average of 10 points of point analysis at an electron beam diameter of 1 μm at a quarter thickness position of the steel sheet. For the Si concentration in the region within 15.0 μm in the thickness direction from the surface of the steel sheet, the concentration distribution of the Si concentration in the range of 0 to 15.0 μm in the thickness direction from the surface of the steel sheet was determined by line analysis with a field emission-electron probe micro analyzer at an electron beam diameter of 0.1 μm from the surface of the steel sheet in the thickness direction. The lowest Si concentration in the concentration distribution was defined as the concentration $L_{Si}$. Also for the Mn concentration in a region within 15.0 μm in a thickness direction from a surface of a steel sheet, the concentration distribution of the Mn concentration in the range of 0 to 15.0 μm in the thickness direction from the surface of the steel sheet was determined by line analysis with a field emission-electron probe micro analyzer at an electron beam diameter of 0.1 μm from the surface of the steel sheet in the thickness direction. The lowest Mn concentration in the concentration distribution was defined as the concentration $L_{Mn}$. The Si concentration, the Mn concentration, $L_{Si}$, $T_{Si}$, $L_{Mn}$, and $T_{Mn}$ are expressed in % by mass. In the measurement of the Si concentration and the Mn concentration with a field emission-electron probe micro analyzer, 10 positions without particulate matter were measured and averaged as the Si concentration and the Mn concentration.

(4) Method of Measuring Soft Layer

Measurement is performed on the soft layer as described below. After smoothing a thickness cross section (L cross section) parallel to the rolling direction of a steel sheet by wet grinding, measurement was performed with a Vickers hardness tester at a load of 10 gf from a 1-μm position to a 100-μm position in the thickness direction from the surface of the steel sheet at intervals of 1 μm. Measurement was then performed at intervals of 20 μm to the central portion in the thickness direction. A region with hardness corresponding to 65% or less of the hardness at a quarter thickness position is defined as a soft layer, and the thickness of the region in the thickness direction is defined as the thickness of the soft layer.

(5) Tensile Properties

A tensile test according to JIS Z 2241 was performed five times on No. 5 test specimens described in JIS Z 2201 having a longitudinal direction (tensile direction) that formed an angle of 90 degrees with the rolling direction. The average yield strength (YS), tensile strength (TS), and butt elongation (El) were determined. The crosshead speed in the tensile test was 10 mm/min. Table 5 shows the calculation results.

(6) LME Resistance

The LME resistance was determined by a resistance welding cracking test. A test specimen of a steel sheet cut to 30 mm×100 mm in a longitudinal direction perpendicular to the rolling direction and another test specimen made of a 980 MPa grade hot-dip galvanized steel sheet were subjected to resistance welding (spot welding) to produce a member. A set of the two steel sheets tilted 5 degrees was subjected to resistance spot welding in a servomotor pressurization type single-phase alternating current (50 Hz) resistance welding machine attached to a welding gun. The welding conditions included a welding pressure of 3.8 kN and a holding time of 0.2 seconds. The welding current ranged from 5.7 to 6.2 kA, the weld time was 21 cycles, and the holding time was 5 cycles. A test specimen was cut in half from the welded member, and a cross section was observed with an optical microscope. A test specimen with no crack of 0.05 mm or more was judged to be best LME cracking (⊙), a test specimen with no crack of 0.1 mm or more was judged to be good LME cracking (O), and a test specimen with a crack of 0.1 mm or more was judged to be poor LME cracking (X).

(7) Weld Fatigue Test

First, spot welding was performed under the following conditions. Electrode: DR 6 mm-40R, welding pressure: 4802 N (490 kgf), and weld time: 17 cycles. The current value was adjusted so that the nugget diameter was 6.5 mm, thereby preparing a cross-tension test specimen. A cross-tension test was then performed in accordance with JIS Z 3137. To simulate high-speed collision, the cross head speed was 100 mm/min. A load range of 7000 N or more was judged to be very good (⊙), a load range of 5000 N or more and less than 7000 N was judged to be good (O), and a load range of less than 5000 N was judged to be poor (x). Table 5 summarizes the results.

TABLE 5

| | | Characteristics of steel sheet structure | | | | | | | | |
|---|---|---|---|---|---|---|---|---|---|---|
| No. | Steel symbol | *1 (%) | *2 (%) | *3 (%) | *4 (%) | *5 (%) | *6 (μm) | $L_{Si} + L_{Mn}$ (%) | $(T_{Si} + T_{Mn})/(L_{Si} + L_{Mn})$ | Thickness of soft layer (μm) |
| 45 | C | 62 | 8 | 12 | 9 | 64 | 7 | 0.5 | 8.6 | 40.0 |
| 46 | C | 65 | 7 | 9 | 9 | 63 | 5 | 0.6 | 7.2 | 35.0 |

TABLE 5-continued

| 47 | A | 64 | 8 | 12 | 9 | 58 | 5 | 0.4 | 10.8 | 35.0 |
| 48 | A | 65 | 9 | 11 | 10 | 55 | 5 | 0.5 | 8.6 | 29.0 |

| No. | YS (MPa) | TS (MPa) | EI (%) | LME cracking resistance | Weld fatigue test | Notes |
|---|---|---|---|---|---|---|
| 45 | 900 | 1202 | 16.2 | ⊙ | ⊙ | Working example |
| 46 | 905 | 1205 | 15.6 | ⊙ | ⊙ | Working example |
| 47 | 910 | 1265 | 14.9 | ⊙ | ⊙ | Working example |
| 48 | 915 | 1270 | 14.7 | ⊙ | ⊙ | Working example |

*1: the total area fraction of bainite and tempered martensite,
*2: fresh martensite area fraction,
*3: retained austenite area fraction,
*4: ferrite area fraction,
*5: the fraction of fresh martensite and retained austenite adjacent to ferrite relative to the total area fraction of fresh martensite and retained austenite,
*6: the average grain size of crystal grains containing an oxide of Si and/or Mn in a region within 15.0 μm in a thickness direction from a surface of a steel sheet As shown in Table 5, the working examples have a TS of 1180 MPa or more and have high LME resistance and good weld fatigue properties.

Example 4

A galvanized steel sheet subjected to galvanizing treatment under the production conditions No. 45 (working example) shown in Table 4 of Example 3 was pressed to produce a member of a working example. Furthermore, a galvanized steel sheet subjected to a galvanizing treatment under the production conditions No. 45 (working example) in Table 4 of Example 3 and a galvanized steel sheet subjected to a galvanizing treatment under the production conditions No. 47 (working example) in Table 4 of Example 3 were joined by spot welding to produce a member of a working example. The members according to the working examples have high LME cracking resistance rated as "⊙", and cross-tension test specimens taken from the members also have good ratings "⊙" in a weld fatigue test. Thus, these members are suitable for automotive parts and the like.

The invention claimed is:

1. A steel sheet having a chemical composition comprising, by mass %:
Si: 0.3% to 2.0%;
Mn: 2.70% or more and less than 4.0%;
C: 0.12% to 0.40%;
P: 0.05% or less;
S: 0.02% or less;
Al: 0.01% to 2.0%;
N: 0.01% or less;
at least one selected from the group consisting of Nb: 0.50% or less, Cr: 1.0% or less, Mo: 0.50% or less, B: 0.005% or less, and Ti: 0.05% or less;
at least one selected from the group consisting of Cu, Ni, Sn, As, Sb, Ca, Mg, Pb, Co, Ta, W, REM, Zn, V, Sr, Cs, Hf, and Zr, in a total amount of 0.1% or less;
optionally an equivalent carbon content Ceq in a range of 0.659% or more; and
the remainder being Fe and incidental impurities,
wherein the steel sheet has a steel microstructure including a total area fraction of bainite and tempered martensite in a range of 50% to 75%, a fresh martensite area fraction in a range of 5% to 15%, a retained austenite area fraction in a range of 8% to 20%, and a ferrite area fraction in a range of 3% to 20%,
a total fraction of the fresh martensite and the retained austenite adjacent to the ferrite is 90% or less of a total area fraction of the fresh martensite and the retained austenite,
an average grain size of all crystal grains containing one or more granular oxides of at least one of Si and Mn in the grains in a region within 4.9 μm in a thickness direction from a surface of the steel sheet is in a range of 3 to 10 μm,
the following formula (1) is satisfied:

$$L_{Si}+L_{Mn} \leq (T_{Si}+T_{Mn})/5 \qquad (1)$$

where $L_{Si}$ is a lowest Si concentration and $L_{Mn}$ is a lowest Mn concentration in the region within 4.9 μm in the thickness direction from the surface of the steel sheet, and $T_{Si}$ is a Si concentration and $T_{Mn}$ is a Mn concentration at a quarter thickness position of the steel sheet, and
the steel sheet has a tensile strength (TS) of 1180 MPa or more.

2. The steel sheet according to claim 1, wherein the steel sheet comprises a soft layer with a thickness in a range of 1.0 to 50.0 μm in the thickness direction from the surface of the steel sheet, the soft layer being a region with hardness corresponding to 65% or less of the hardness at a quarter thickness position from the surface of the steel sheet.

3. The steel sheet according to claim 2, wherein the steel sheet comprises a hot-dip galvanized layer or a hot-dip galvannealed layer on the surface of the steel sheet.

4. A member produced by performing at least one of forming and welding on the steel sheet according to claim 3.

5. A member produced by performing at least one of forming and welding on the steel sheet according to claim 2.

6. The steel sheet according to claim 1, wherein the steel sheet comprises a hot-dip galvanized layer or a hot-dip galvannealed layer on a surface of the steel sheet.

7. A member produced by performing at least one of forming and welding on the steel sheet according to claim 6.

8. A member produced by performing at least one of forming and welding on the steel sheet according to claim 1.

9. A method for producing a steel sheet according to claim 1, the method comprising:
a hot-rolling step of hot-rolling a steel slab with the chemical composition at a cumulative strain in a range of 0.10 to 0.80 in final two rolling stages followed by coiling at a coiling temperature in a range of 470° C. to 800° C.;
a cold-rolling step of cold-rolling a hot-rolled steel sheet formed in the hot-rolling step;

an annealing step of holding a cold-rolled steel sheet formed in the cold-rolling step at a dew-point temperature in a range of −50° C. to 0° C. and at an annealing temperature in a range of 750° C. to 900° C., cooling the cold-rolled steel sheet to a cooling stop temperature in a range of 150° C. to 340° C., and bending and unbending the cold-rolled steel sheet three to eight times in total with a roller having a radius in a range of 100 to 1000 mm while cooling from the annealing temperature to the cooling stop temperature;

a reheating step of reheating the steel sheet after the annealing step to a reheating temperature in a range of 350° C. to 600° C. and holding the reheating temperature; and optionally a plating step of performing hot-dip galvanizing or hot-dip galvannealing on the steel sheet after the reheating step.

10. A method for producing a member, the method comprising the step of performing at least one of forming and welding on the steel sheet produced by the method for producing a steel sheet according to claim 9.

11. A method for producing a steel sheet according to claim 1, the method comprising:

a hot-rolling step of hot-rolling a steel slab with the chemical composition at a cumulative strain in a range of 0.10 to 0.80 in final two rolling stages followed by coiling at a coiling temperature in a range of 470° C. to 800° C.;

a cold-rolling step of cold-rolling a hot-rolled steel sheet formed in the hot-rolling step;

an annealing step of holding a cold-rolled steel sheet formed in the cold-rolling step at a dew-point temperature in a range of −50° C. to 0° C. and at an annealing temperature in a range of 750° C. to 900° C., cooling the cold-rolled steel sheet to a cooling stop temperature in a range of 350° C. to 500° C., and bending and unbending the cold-rolled steel sheet three to eight times in total with a roller having a radius in a range of 100 to 1000 mm while cooling from the annealing temperature to the cooling stop temperature;

a plating step of performing hot-dip galvanizing or hot-dip galvannealing on the steel sheet after the annealing step; and a reheating step of cooling the steel sheet after the plating step to a cooling stop temperature in a range of 50° C. to 350° C., reheating the steel sheet to a reheating temperature exceeding the cooling stop temperature and in a range of 300° C. to 500° C., and holding the reheating temperature.

12. A method for producing a member, the method comprising the step of performing at least one of forming and welding on the steel sheet produced by the method for producing a steel sheet according to claim 11.

13. A steel sheet having a chemical composition comprising, by mass %:
Si: 0.3% to 2.0%;
Mn: 2.70% or more and less than 4.0%;
C: 0.12% to 0.40%;
P: 0.05% or less;
S: 0.02% or less;
Al: 0.01% to 2.0%;
N: 0.01% or less;
at least one selected from the group consisting of Nb: 0.50% or less, Cr: 1.0% or less, Mo: 0.50% or less, B: 0.005% or less, and Ti: 0.05% or less;

at least one selected from the group consisting of Cu, Ni, Sn, As, Sb, Ca, Mg, Pb, Co, Ta, W, REM, Zn, V, Sr, Cs, Hf, and Zr, in a total amount of 0.1% or less;

optionally an equivalent carbon content Ceq in a range of 0.659% or more; and the remainder being Fe and incidental impurities, wherein the steel sheet has a steel microstructure including a total area fraction of bainite and tempered martensite in a range of 50% to 75%, a fresh martensite area fraction in a range of 5% to 15%, a retained austenite area fraction in a range of 8% to 20%, and a ferrite area fraction in a range of 3% to 20%, a total fraction of the fresh martensite and the retained austenite adjacent to the ferrite is 90% or less of a total area fraction of the fresh martensite and the retained austenite, an average grain size of all crystal grains containing one or more granular oxides of at least one of Si and Mn in the grains in a region within 15.0 μm in a thickness direction from a surface of the steel sheet is in a range of 3 to 10 μm, the following formula (1) is satisfied:

$$L_{Si}+L_{Mn} \leq (T_{Si}+T_{Mn})/5 \qquad (1)$$

where $L_{Si}$ is a lowest Si concentration and $L_{Mn}$ is a lowest Mn concentration in the region within 15.0 μm in the thickness direction from the surface of the steel sheet, and $T_{Si}$ is a Si concentration and $T_{Mn}$ is a Mn concentration at a quarter thickness position of the steel sheet, and the steel sheet has a tensile strength (TS) of 1180 MPa or more.

14. The steel sheet according to claim 13, wherein the steel sheet comprises a soft layer with a thickness in a range of 1.0 to 50.0 μm in the thickness direction from the surface of the steel sheet, the soft layer being a region with hardness corresponding to 65% or less of the hardness at a quarter thickness position from the surface of the steel sheet.

15. The steel sheet according to claim 14, wherein the steel sheet comprises a hot-dip galvanized layer or a hot-dip galvannealed layer on a surface of the steel sheet.

16. A member produced by performing at least one of forming and welding on the steel sheet according to claim 15.

17. A member produced by performing at least one of forming and welding on the steel sheet according to claim 14.

18. The steel sheet according to claim 13, wherein the steel sheet comprises a hot-dip galvanized layer or a hot-dip galvannealed layer on a surface of the steel sheet.

19. A member produced by performing at least one of forming and welding on the steel sheet according to claim 18.

20. A member produced by performing at least one of forming and welding on the steel sheet according to claim 13.

21. A method for producing a steel sheet according to claim 13, the method comprising:

a hot-rolling step of hot-rolling a steel slab with the chemical composition at a cumulative strain in a range of 0.10 to 0.80 in final two rolling stages followed by coiling at a coiling temperature in a range of 470° C. to 800° C.;

a cold-rolling step of cold-rolling a hot-rolled steel sheet formed in the hot-rolling step;

an annealing step of holding a cold-rolled steel sheet formed in the cold-rolling step at a dew-point temperature in a range of −50° C. to 20° C. and at an annealing temperature in a range of 750° C. to 900° C., cooling the cold-rolled steel sheet to a cooling stop temperature in a range of 150° C. to 340° C., and bending and unbending the cold-rolled steel sheet three to eight times in total with a roller having a radius in a range of 100 to 1000 mm while cooling from the annealing temperature to the cooling stop temperature; and a reheating step of reheating the steel sheet after the annealing step to a reheating temperature in a range of 350° C. to 600° C. and holding the reheating temperature; and optionally a plating step of performing hot-dip galvanizing or hot-dip galvannealing on the steel sheet after the reheating step.

22. A method for producing a member, the method comprising a step of performing at least one of forming and welding on the steel sheet produced by the method for producing a steel sheet according to claim 21.

23. A method for producing a steel sheet according to claim 13, the method comprising:

a hot-rolling step of hot-rolling a steel slab with the chemical composition at a cumulative strain in a range of 0.10 to 0.80 in final two rolling stages followed by coiling at a coiling temperature in a range of 470° C. to 800° C.;

a cold-rolling step of cold-rolling a hot-rolled steel sheet formed in the hot-rolling step;

an annealing step of holding a cold-rolled steel sheet formed in the cold-rolling step at a dew-point temperature in a range of −50° C. to 20° C. and at an annealing temperature in a range of 750° C. to 900° C., cooling the cold-rolled steel sheet to a cooling stop temperature in a range of 350° C. to 500° C., and bending and unbending the cold-rolled steel sheet three to eight times in total with a roller having a radius in a range of 100 to 1000 mm while cooling from the annealing temperature to the cooling stop temperature;

a plating step of performing hot-dip galvanizing or hot-dip galvannealing on the steel sheet after the annealing step; and a reheating step of cooling the steel sheet after the plating step to a cooling stop temperature in a range of 50° C. to 350° C., reheating the steel sheet to a reheating temperature exceeding the cooling stop temperature and in a range of 300° C. to 500° C., and holding the reheating temperature.

24. A method for producing a member, the method comprising a step of performing at least one of forming and welding on the steel sheet produced by the method for producing a steel sheet according to claim 23.

* * * * *